(12) United States Patent
Lu

(10) Patent No.: US 6,363,174 B1
(45) Date of Patent: Mar. 26, 2002

(54) METHOD AND APPARATUS FOR CONTENT IDENTIFICATION AND CATEGORIZATION OF TEXTUAL DATA

(75) Inventor: Ning Lu, Mountain View, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/222,566

(22) Filed: Dec. 28, 1998

(51) Int. Cl.$^7$ ................................................. G06K 9/62
(52) U.S. Cl. ........................................ 382/209; 707/6
(58) Field of Search ............................. 382/209, 210, 382/211, 212, 216, 231; 707/4, 6

(56) References Cited

U.S. PATENT DOCUMENTS

| | | | | |
|---|---|---|---|---|
| 4,996,707 A | * | 2/1991 | O'Malley et al. | 379/100 |
| 5,077,668 A | * | 12/1991 | Doi | 364/419 |
| 5,390,259 A | * | 2/1995 | Withgott et al. | 382/9 |
| 6,075,470 A | * | 6/2000 | Little et al. | 341/107 |
| 6,119,120 A | * | 9/2000 | Miller | 707/101 |

OTHER PUBLICATIONS

M. Burrows and D.J. Wheeler, *A Block–sorting Lossless Data Compression Algorithm*, Digital Systems Research Center Research Report 124; http://gatekeeper.dec.com/pub/DEC/SRC/research–reports/abstracts/src–rr–124.html.

M. Nelson, *Data Compression with the Burrows–Wheeler Transform*, Dr. Dobb's Journal Sep. 1996; http://web2.airmail.net/markn/articlesbwt/bwt.htm.

Ning Lu, *Fractal Imaging, Chapter 12. Entropy Coding*, Academic Press, 1997.

Y. Yang, *An Evaluation of Statistical Approaches to Text Categorization*, Preprint, Apr. 10, 1997.

W.W. Cohen, *Learning to Classify English Text with ILP Methods*, Aug. 8, 1995.

D.D. Lewis, R.E. Schapire, J.P. Callan, and R. Papka, *Training Algorithms for Linear Text Classifiers*, in *Proceedings of 19th ACM SIGIR Conference on R&D in Information Retrieval*, 1996, pp. 298–306.

* cited by examiner

Primary Examiner—Andrew W. Johns
Assistant Examiner—Seyed Azarian
(74) Attorney, Agent, or Firm—Blakely, Sokoloff, Taylor & Zafman LLP

(57) ABSTRACT

A method and an apparatus for content identification and categorization of textual data is disclosed. Using the Burrows-Wheeler transform in conjunction with mapping techniques and statistical comparison, useful information can be extracted from textual documents. This information can be used to categorize, authenticate, and compare such documents, thereby leading to automated searching of databases of documents.

24 Claims, 27 Drawing Sheets

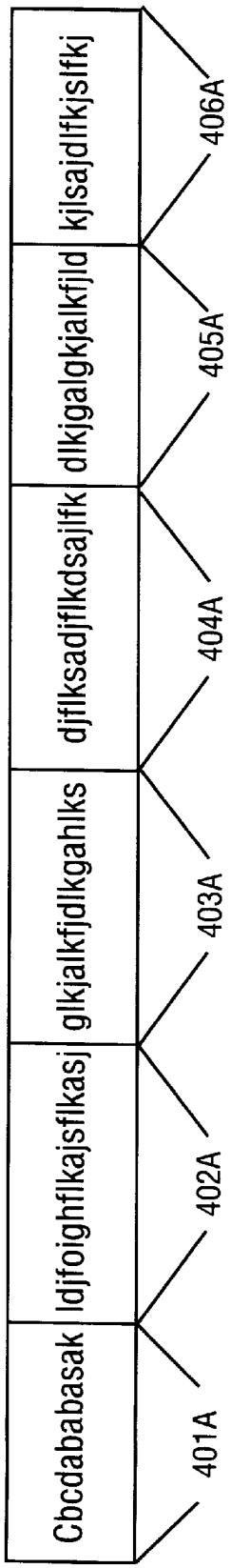

| L | A | B | C | D |
|---|---|---|---|---|
| 0 | 0 | 0 | 0 | 0 |
| 1 | 0 | 0 | 0 | 0 |
| 2 | 0 | 0 | 0 | 0 |

FIG. 5A

| L | A | B | C | D |
|---|---|---|---|---|
| 0 | 0 | 1 | 2 | 0 |
| 1 | 1 | 1 | 0 | 1 |
| 2 | 2 | 1 | 0 | 0 |

FIG. 5B

|  | Bible Joshua 10 | Bible John 20 | Shakespeare Hamlet | Shakespeare Romeo & Juliet |
|---|---|---|---|---|
| Bible - Joshua 10 | 0 | 0.7642 | 1.0465 | 1.0128 |
| Bible - John 20 | 0.7642 | 0 | 0.9139 | 1.0043 |
| Shakespeare - Hamlet | 1.0465 | 0.9139 | 0 | 0.7268 |
| Shakespeare - Romeo & Juliet | 1.0128 | 1.0043 | 0.7268 | 0 |

FIG. 6A

|  | English | German | French | Spanish |
|---|---|---|---|---|
| English | 0 | 1.1374 | 1.2440 | 1.3671 |
| German | 1.1374 | 0 | 1.2410 | 1.2993 |
| French | 1.2440 | 1.2410 | 0 | 1.1786 |
| Spanish | 1.3671 | 1.2993 | 1.1786 | 0 |

FIG. 6B

Column "H" in the pattern sheets of

*Bible - Josh 10*

*Bible - John 20*

*Shakespeare's Hamlet*

*Shakespeare's Romeo & Juliet*

Column "H" in the pattern sheets of

Les Miserable (English)

Les Miserable (German)

Les Miserable (French)

Les Miserable (Spanish)

```
unsigned char Chartable[256] = {
    31,31,31,31,31,31,31,31,31,31,31,31,31,31,31,31,
    31,31,31,31,31,31,31,31,31,31,31,31,31,31,31,31,
    30,27,28,29,29,29,29,28,28,28,29,29,27,29,27,29,
     0, 0, 0, 0, 0, 0, 0, 0, 0, 0,27, 27, 29, 29, 29, 27,
    29, 1, 2, 3, 4, 5, 6, 7, 8, 9,10,11,12,13,14,15,
    16,17,18,19,20,21,22,23,24,25,26,28,29,28,29,31,
    31,31,31,31,31,31,31,31,31,31,31,31,31,31,31,31,
    31,31,31,31,31,31,31,31,31,31,31,31,31,31,31,31,
    31,31,31,31,31,31,31,31,31,31,31,31,31,31,31,31,
    31,31,31,31,31,31,31,31,31,31,31,31,31,31,31,31  };
```

FIG. 11

METHOD AND APPARATUS FOR CONTENT IDENTIFICATION AND CATEGORIZATION OF TEXTUAL DATA

BACKGROUND OF THE INVENTION

1. Field of the Invention

The invention relates to data manipulation and categorization in general, and specifically to processing of textual data for categorization, content identification and authentication.

2. Background Information

With the advent of the electronic age and the internet as a useful means for communication and storage of data, there is a need for systems for determining whether a given document was authored by a certain person, whether a given document is in a particular language, or what type of material a given document deals with. This is not well addressed by present methods of textual analysis. At best, currently it is possible to analyze a given document utilizing phrase or key word searches and then have a human look at the results of such analysis in an attempt to determine their authorship, content, or language. What is needed is a methodology that will produce a result that can be more readily analyzed by a computer without human intervention. Additionally, what is needed is a methodology that can look at frequency of character utilization, key word searches and frequency of occurrences of phrases all at once rather than looking at them discretely.

SUMMARY OF THE INVENTION

The present invention provides a method and apparatus for content identification and categorization of data. In one embodiment, a Burrows-Wheeler Transform is performed on a document of textual data to produce a set of transformed textual data. The transformed textual data is divided into a set of one or more intervals. The transformed textual data of that set of intervals is transformed to produce a pattern map. The pattern map is compared to a reference pattern map thereby producing an indication of whether the subject textual data is of a type corresponding to the reference pattern map.

BRIEF DESCRIPTION OF THE DRAWINGS

The present invention is illustrated by way of example and not limitation in the accompanying figures.

FIG. 4A is an illustration of a small number of intervals within a given textual document.

FIG. 4B is an illustration of the textual document of FIG. 4A with a large number of intervals.

FIG. 5A illustrates an exemplary zero pattern map.

FIG. 5B is an exemplary pattern map generated from the data used in the Burrows-Wheeler Transform of FIG. 1.

FIG. 6A illustrates results reduced to a single number for correspondence between various textual documents in the English language.

FIG. 6B illustrates results reduced to a single number for correspondence between several textual documents derived from the same source in different languages.

FIGS. 8A, 8B, 8C, 8D, 8E, 8F, 8G and 8H represent portions of exemplary pattern maps.

FIGS. 10A, 10B, 10C, 10D, 10E, 10F, 10G and 10H represent portions of exemplary pattern maps.

FIG. 11 is an exemplary mapping table for mapping an ASCII character to the corresponding column in a pattern sheet or pattern map.

DETAILED DESCRIPTION

Figure 1:
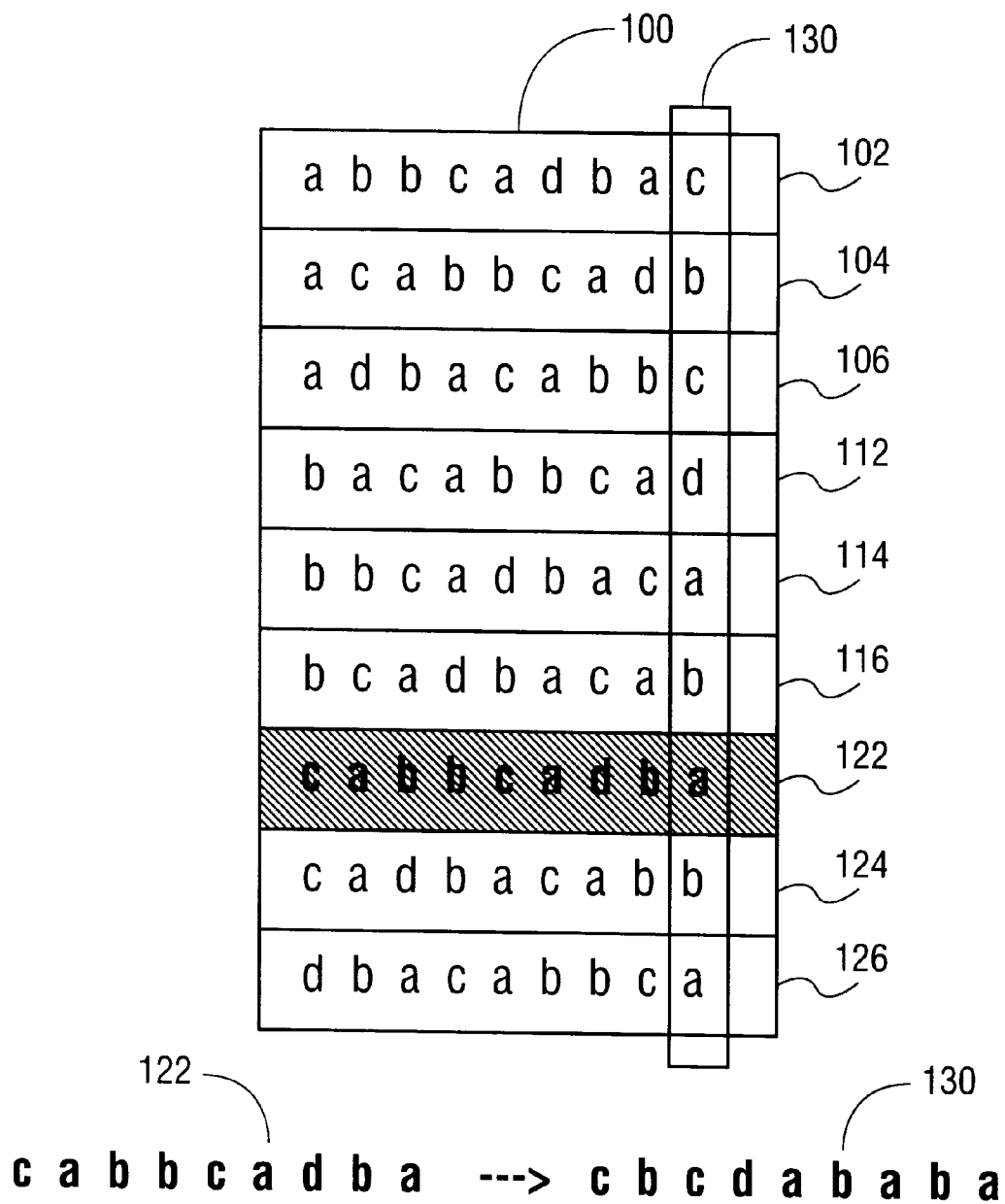
FIG. 1 illustrates a Burrows-Wheeler Transform.

FIG. 1 illustrates a Burrows-Wheeler Transform as described by Burrows and Wheeler (M. Burrows and D. J. Wheeler, *A Block-sorting Lossless Data Compression Algorithm*, Digital Systems Research Center Research Report 124, http://gatekeeper.dec.com/pub/DEC/SRC/research-reports/abstracts/src-rr-124.html). Turning to FIG. 1, array 100 shows text 122 sorted by the first letter of each possible permutation of text 122 and each entry of array 100 is sorted in dictionary order such that entry 104 comes after entry 102 and before entry 106 according to the standard English dictionary. Column 130, the last column of each row of array 100 represents the Burrows-Wheeler Transform of data 122.

The Burrows-Wheeler Transform can be performed in a variety of ways known in the art. One method is disclosed in a copending application entitled "Method and Apparatus for Dictionary Sorting" filed on the same day as this application, which is hereby incorporated by reference.

Figure 2:
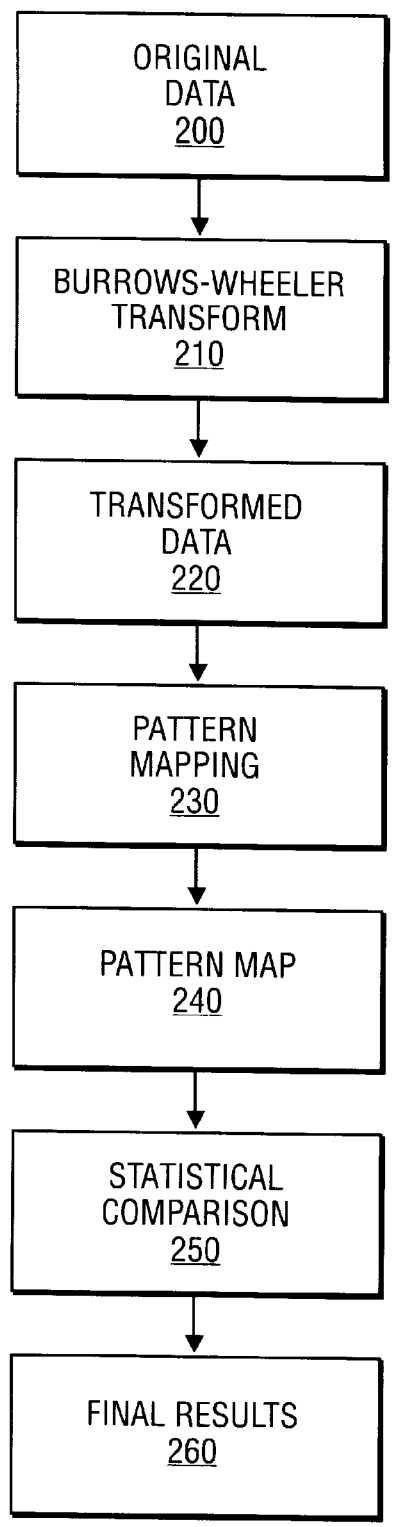
FIG. 2 is a flow chart illustrating one embodiment of the present invention.

FIG. 2 is a flow chart illustrating one embodiment of the present invention. In this embodiment data 200 is an original textual document to be categorized or otherwise evaluated. A Burrows-Wheeler Transform 210 is performed on data 200 thereby resulting in Burrows-Wheeler Transformed data 220. Mapping 230 is performed on the Burrows-Wheeler Transformed data 220 to produce map 240. Statistical comparison 250 is performed on map 240 to achieve result 260.

Result 260 may consist of a variety of information regarding content. For example, result 260 may be an expression of whether data 200 in the original document was authored by a particular person, whether data 200 is of a particular language, or whether data 200 is similar to a particular type of document. Result 260 can be embodied in a variety of forms including a single number, a table, or a two or three-dimensional graphical representation such as a histogram or curve. Furthermore, result 260 can be shaped by statistical comparison 250 and mapping 230 to represent a particular subset of data 200 or it can be set up to represent equally all of data 200.

Figure 3:
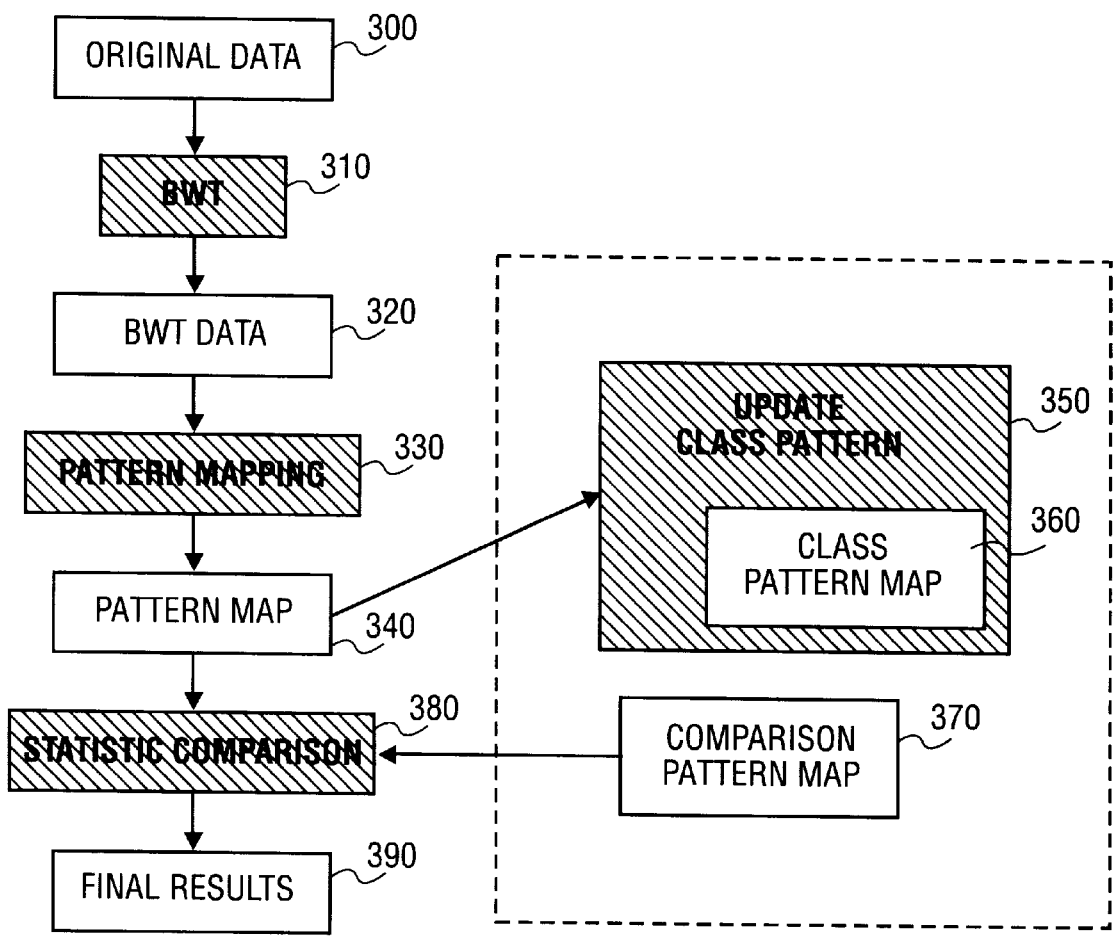
FIG. 3 is a flow chart illustrating an alternative embodiment of the present invention.

FIG. 3 represents an alternative embodiment of the present invention. Data 300 represents data in a textual document which for purposes of discussion may be the same as data 200 of FIG. 2. A Burrows-Wheeler Transform 310 is performed on data 300 to produce Burrows-Wheeler Transformed data 320. Mapping 330 is performed on Burrows-Wheeler Transformed data 320 to produce map 340. Updating class pattern 350 is performed to change class pattern map 360. Statistical comparison 380 compares comparison pattern map 370 with pattern map 340 to produce final results 390. It should be noted that comparison pattern map 370 can be the same as class pattern map 360 or it can be something entirely different. For example, class pattern map 360 may represent a map typical of the works of Shakespeare if original data 300 was supposedly one of Shakespeare's plays, for instance *Romeo and Juliet*. Additionally, it could be a pattern map for Sir Francis Bacon, and the works that he produced if someone were attempting to determine whether Shakespeare's works were written by Bacon. Final results 390 can, similarly to results 260 of FIG. 2, take the form of a single number expressing a correlation, it can take the form of an array of numbers similar to a pattern map such as pattern map 340. Final results 390 could also take the form of a two-dimensional or three-dimensional graph.

Figure 4C:
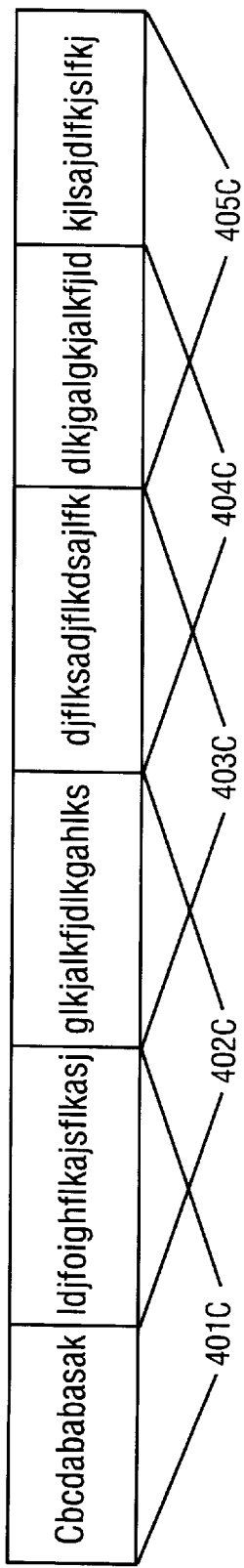
FIG. 4C is an illustration of the textual document of FIG. 4A where the intervals overlap.
Figure 4D:
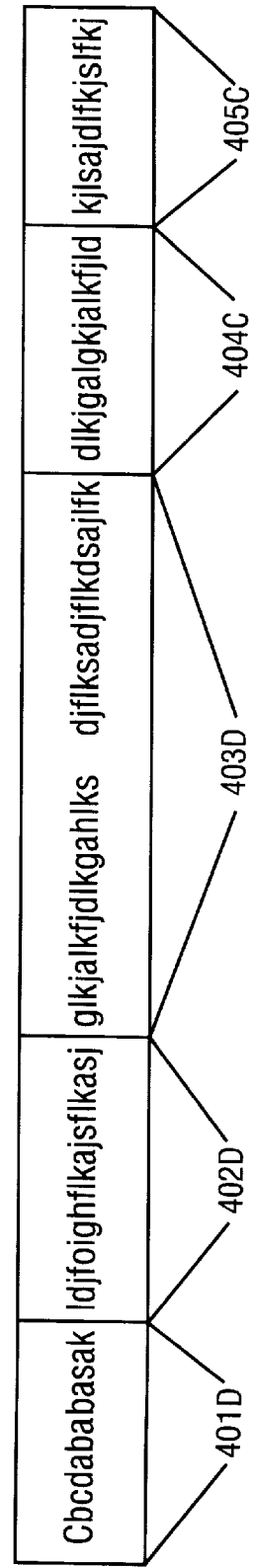
FIG. 4D is an illustration of the textual document of FIG. 4A where the intervals are of variable length.

Turning to FIGS. 4A through 4D, each illustrates a different possible selection of intervals within a document. FIG. 4A illustrates a small number of intervals in the document. Typically, each of intervals 401a, 402a, 403a, 404a, 405a, 406a may be the same length, or the same number of characters. However, this is not an absolute requirement and it is not strictly met within this example. FIG. 4B illustrates a large number of intervals in the document. Again, typically each interval would be the same size as each other interval. FIG. 4C illustrates one example of overlapping intervals. In this case, interval 401c overlaps with interval 402c. Interval 402c overlaps with both 401c and 403c. Interval 403c overlaps with both intervals 402c and 404c, and interval 404c overlaps with both 403c and 405c. Finally, FIG. 4D illustrates a case where the chosen intervals are not of the same length, as interval 403d is significantly larger than any of intervals 401d, 402d, 404d, or 405d. This results in emphasis on the ends of the document for statistical analysis purposes.

Turning to FIGS. 5A and 5B, both illustrate exemplary pattern sheets appropriate for textual data 122 from FIG. 1. FIG. 5A is a zero pattern sheet. The pattern sheet includes a column for each character that is to be counted and a row for each interval L that textual data 122 is divided into. At the intersection of each column and each row is an entry. In the case of a zero pattern sheet, each entry is zero.

FIG. 5B is a pattern sheet for textual data 122. In this case, each entry holds the number of characters, corresponding to the column for that entry, that were found within the interval corresponding to the row for that entry. In this case, the interval corresponding to row zero ('0' in the 'L' column) includes the first three rows of the array of FIG. 1, namely rows 102, 104, and 106. The interval corresponding to row one ('1' in the 'L' column) includes the next three rows of the array of FIG. 1, namely rows 112, 114, and 116. Finally, the interval corresponding to row two ('2' in the 'L' column) includes the final three rows of the array of FIG. 1, namely rows 122, 124, and 126. Since there are 'c' characters in rows 102 and 106 of the Burrows-Wheeler transform of the text in FIG. 1, an entry of '2' is located at the intersection of the 'C' column and the '0' row of FIG. 5B. Each of the other eight locations is derived in the same manner.

Typically, a pattern map is a normalized pattern sheet, but the two terms can be interchangeable, as both pattern sheets and pattern maps take the form of two dimensional arrays of numbers derived from a text document, and some pattern sheets would not require normalization to be transformed to pattern maps.

FIGS. 6A and 6B show the results of one method of comparing pattern maps generated from various documents using one embodiment of the method of the present invention. In both FIGS. 6A and 6B, the numbers are derived from comparing the 'H' columns of the pattern maps generated for the corresponding documents. FIG. 6A shows a comparison of four different documents to each other, the four documents being the Book of Joshua, Chapter 10 of the Bible, the Book of John, Chapter 20 of the Bible, Shakespeare's *Hamlet* and Shakespeare's *Romeo and Juliet*. The metrics for generating such a comparison usually have a form of:

$$(\Sigma a_i (p_i - r_i)^b)^{1/b}$$

Normally, $a_i$ and b are integers. As will be apparent to one skilled in the art, $a_i$ can be set to different values for each i thereby assigning a weight to each interval. In this case, the $L^2$-distance was applied to the 'H' columns of the appropriate maps to generate these numbers, the $L^2$-distance having the form of:

$$\sqrt{\frac{2}{\Sigma(p_i^2 - r_i^2)} \left( \sum_{p_i \text{ in } 'H' \text{ column}} (p_i - r_i)^2 \right)}$$

In both expressions, $p_i$ is an entry in the pattern map generated from the subject document and $r_i$ is an entry in the pattern map generated from whatever the subject document is being compared to. Normally, entries in the pattern maps would be addressed in the form $p_{ij}$ but in this case, each entry is in the 'H' column, so j is constant in this formula and therefore not shown. If the formula were applied to multiple columns, it might involve summing the results of the formula for each column, averaging these same results, or some other statistically meaningful method of combining the results. A formula for summing the results of multiple columns might look like this (L is the number of intervals):

$$\sum_{\substack{\text{for each } j \text{ corresponding} \\ \text{to a column to be summed}}} \left( \sqrt{\frac{2}{\sum_{i=0}^{L-1}(p_{ij}^2 - r_{ij}^2)} \left( \sum_{i=0}^{L-1} p_{ij} - r_{ij} \right)^2} \right)$$

and a formula for averaging the results of multiple columns might look like this:

$$\frac{\sum_{\substack{\text{for each } j \text{ corresponding} \\ \text{to a column to be summed}}} \left( \sqrt{\frac{2}{\sum_{i=0}^{L-1}(p_{ij}^2 - r_{ij}^2)} \left( \sum_{i=0}^{L-1} p_{ij} - r_{ij} \right)^2} \right)}{\text{Number of columns to be summed}}$$

In this case, the pattern map for what the subject document is being compared to is the pattern map for another document. For instance, the pattern maps used to generate the entry at the intersection of Shakespeare's *Hamlet* and Shakespeare's *Romeo and Juliet* would be the pattern maps generated from the two plays respectively.

The $L^2$-distance may be applied to other columns within the pattern maps generated for each document, and further it may be applied to multiple columns within each pattern map. As can be seen though, in this example the 'H' column results in significant differences between comparisons of works from similar times (comparing the two Bible chapters or the two Shakespeare plays) and works from differing times (comparing a Bible chapter and a Shakespeare play).

Turning to FIG. 6B, this table shows the results of comparing pattern maps for Victor Hugo's *Les Miserables* as translated into different languages. In each case, the L²-distance was applied to the 'H' column of the various different translations. As expected, comparing a text to itself results in an L²-distance of zero, whereas comparing a text in one language to a text in another language, even though derived from the same work, results in a large L²-distance.

Other methods of comparing pattern maps and pattern sheets may be used. In particular, generation of a relative pattern sheet or pattern map from two pattern maps may be done by generating one entry in a new or third (R) pattern sheet given a first (P) and a second (Q) pattern sheet. Each entry may be determined as the difference between the entry of the first pattern sheet and the second pattern sheet with the equation:

$$R_{ij} = P_{ij} - Q_{ij}$$

In this equation and the following one, $P_{ij}$ and $Q_{ij}$ represent the value or magnitude of the entry at the row and column corresponding to the values of i and j in the pattern map. A possibly more useful equation, which would generate an entry based on the proportion of the corresponding entries of each sheet to the total of all entries of each sheet is:

$$R_{ij} = \frac{P_{ij}}{\Sigma(P)} - \frac{Q_{ij}}{\Sigma(Q)}$$

where $\Sigma(P)$ and $\Sigma(Q)$ represent the total of all entries of the corresponding tables. Additionally, one might generate a relative pattern sheet where each entry was derived from the difference between the entries divided by the total of all entries for a corresponding column in each of the two sheets.

Figure 7:
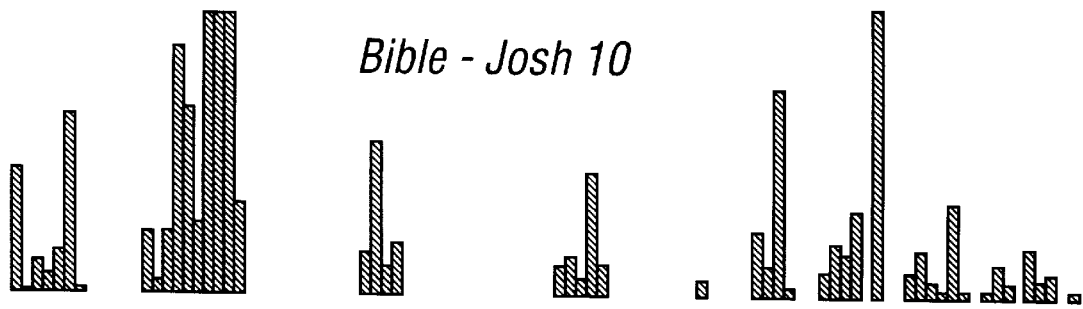
FIG. 7 is a plot of the occurrences for the letter H within text from the Bible and from two of Shakespeare's plays.
Figure 7:
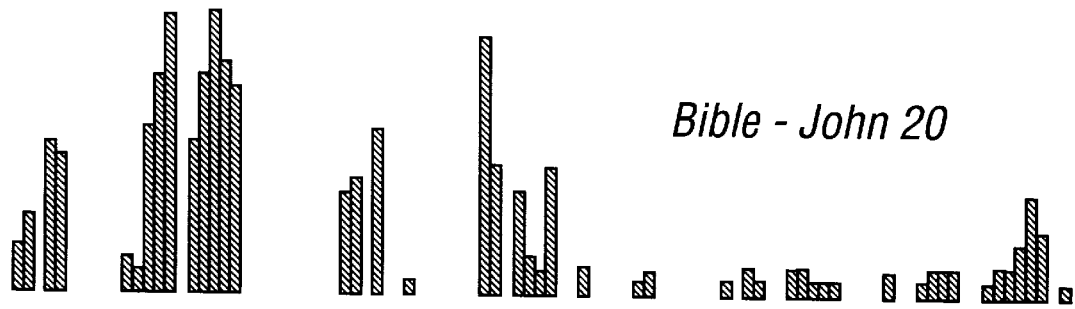
Figure 7:
Figure 7:
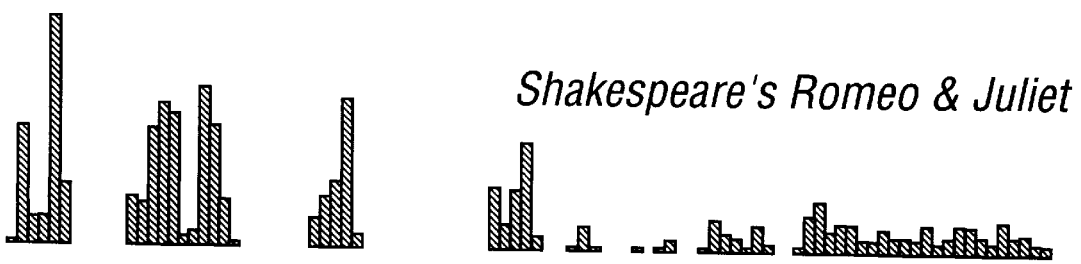

FIG. 7 illustrates a plot of the 'H' column in each of the pattern sheets for the two Chapters of the Bible and the two Shakespeare plays. Each column of the plot corresponds to an interval of the document, with the height of the column corresponding to the number of 'H's found in that interval. Also, note that these plots have been normalized by well known techniques.

FIGS. 8A through 8H are pattern sheets generated from the documents compared in FIG. 6A. In each case, a set of 100 intervals were used, and while each character was broken out into its own column, such as 'H', the numerals were all treated as identical, the punctuation marks were grouped into three categories, all sets of continuous space characters were treated as identical, and other characters were treated as unidentified. In particular, the three categories for punctuation were: sentence pause punctuation marks (',',';',':','.',':','?','!'), grouping punctuation marks ('{','[','(', '<','"','"', etc.), and math operations ('+','−','%','^','*','=', ',','/','|', '\','#', etc.). FIG. 11 is a table showing how the ASCII character set is mapped to each of the different columns of FIGS. 8A through 8H and FIGS. 10A through 10H. As can be seen from FIG. 11, both capital and lowercase versions of a given letter of the alphabet are mapped to the same column.

Note that these pattern sheets can be normalized, for instance by multiplying each entry by a constant and they can be massaged with an equalizer function designed to proportionally reduce the largest entries and increase the smallest entries. Other methods of normalization could be used to focus further processing on part of the pattern map, such as multiplying selected entries in the table by one scale factor and unselected entries in a table by another scale factor, thereby emphasizing one portion of the map over another portion. Furthermore, normalization of a pattern sheet might involve combining rows of the sheet (corresponding to intervals of the document) to reduce the number of rows in the map to a standard number. Such a process might be called for when documents of significantly different size are being compared.

Figure 8A:
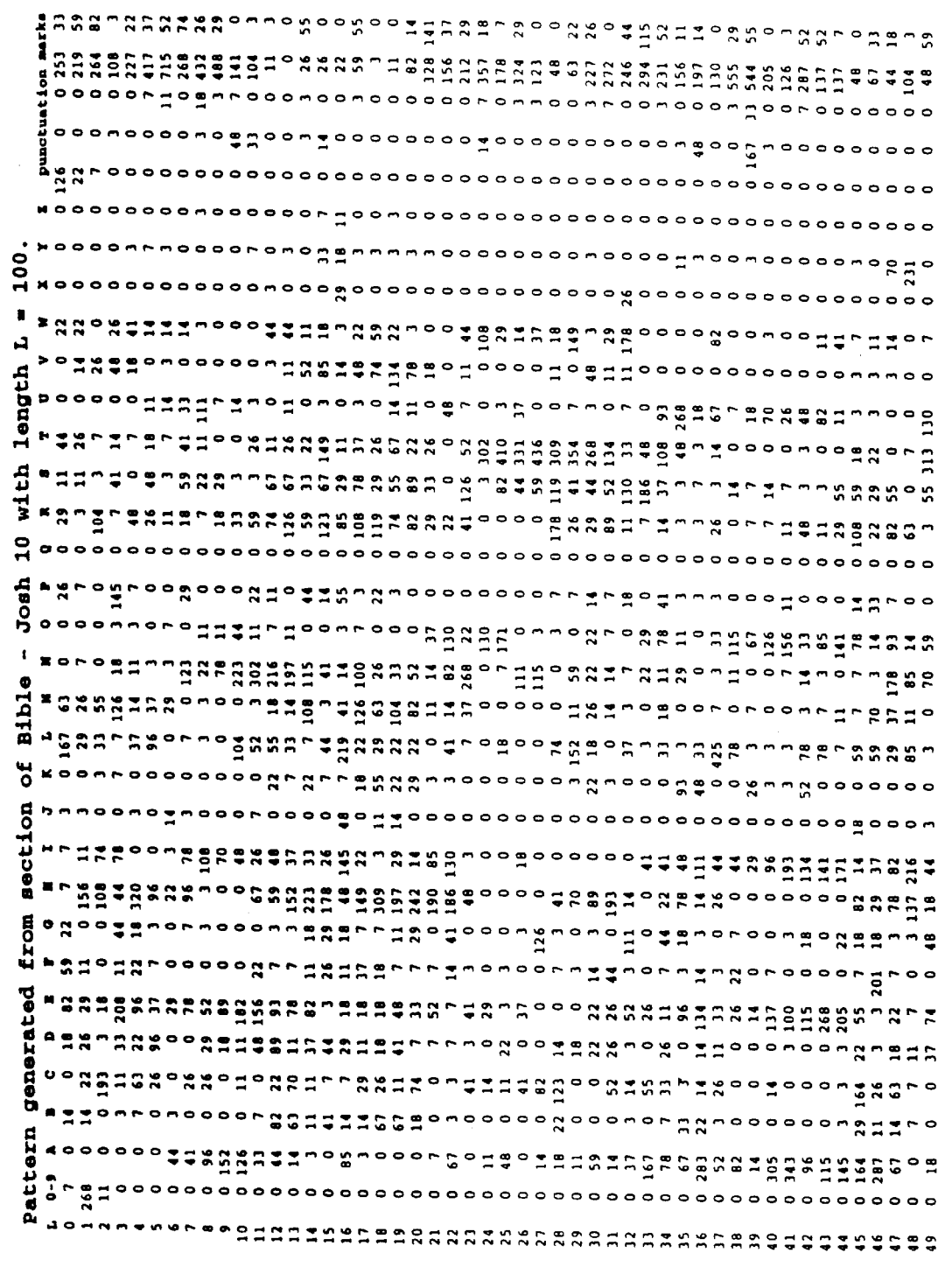
Figure 8B:
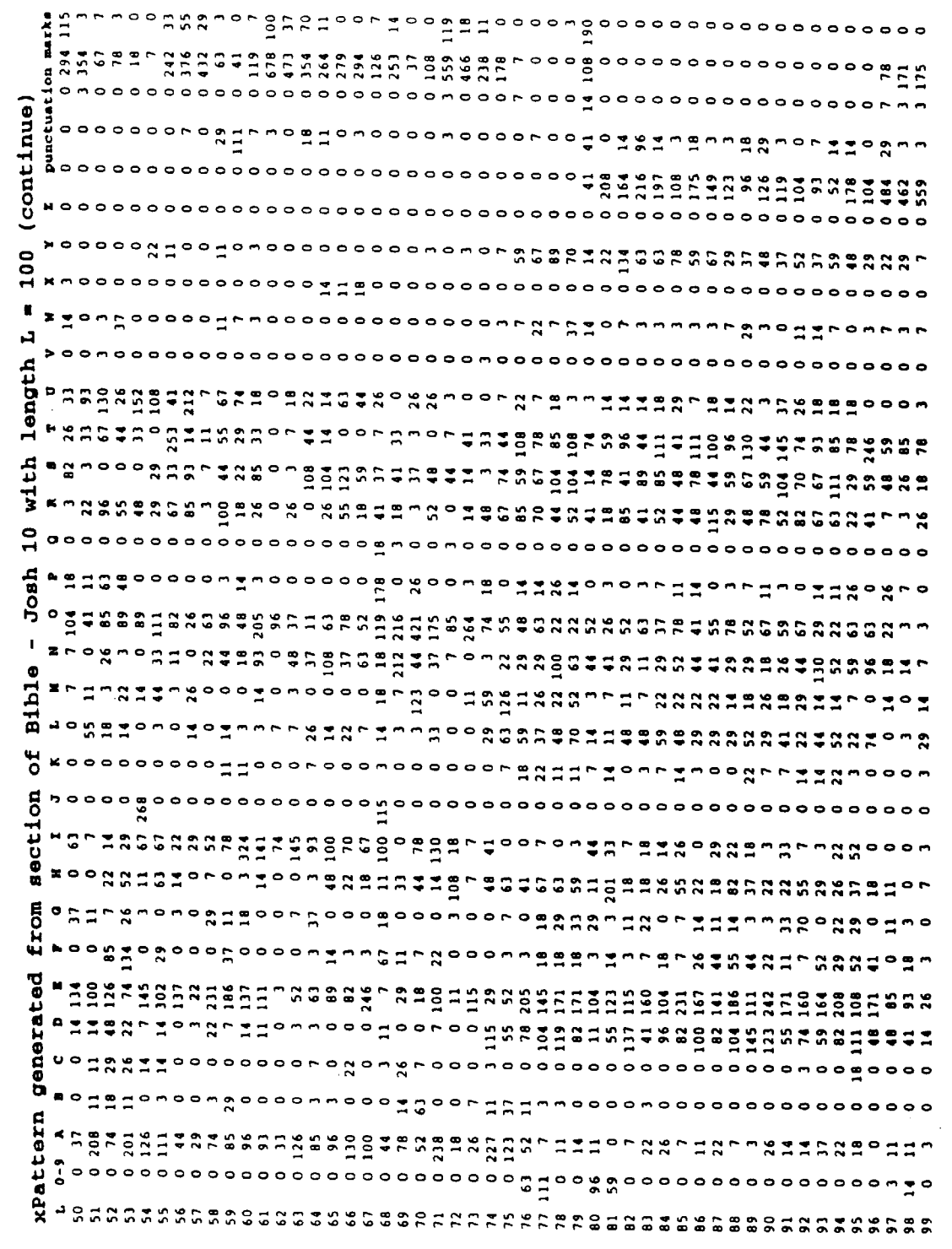

FIGS. 8A and 8B are the pattern sheet generated from the Book of Joshua, Chapter 10 of the Bible. FIG. 8A is the portion of the pattern sheet for intervals 0 to 49. FIG. 8B is the portion of the pattern sheet for intervals 50 to 99.

Figure 8C:
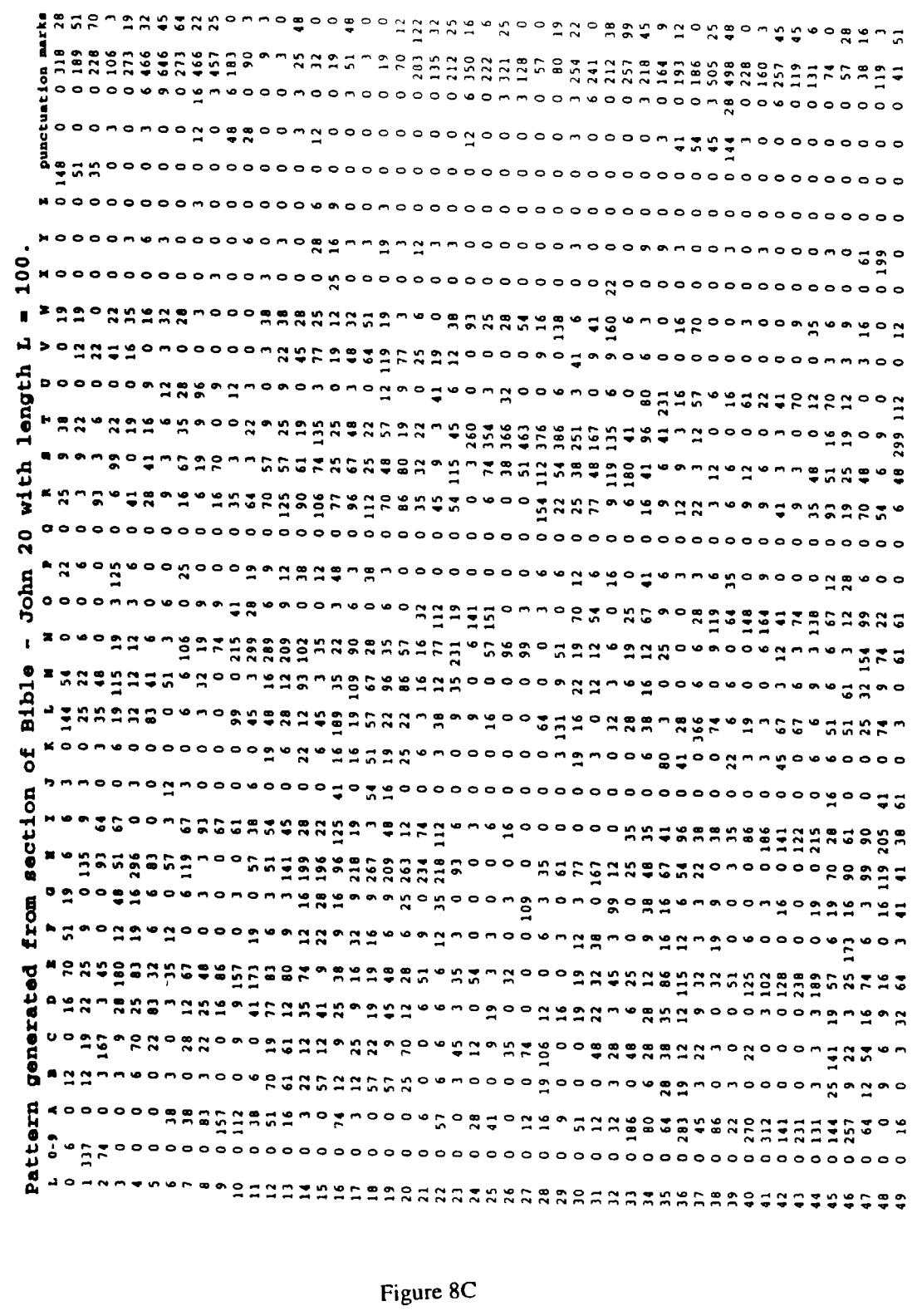
Figure 8D:
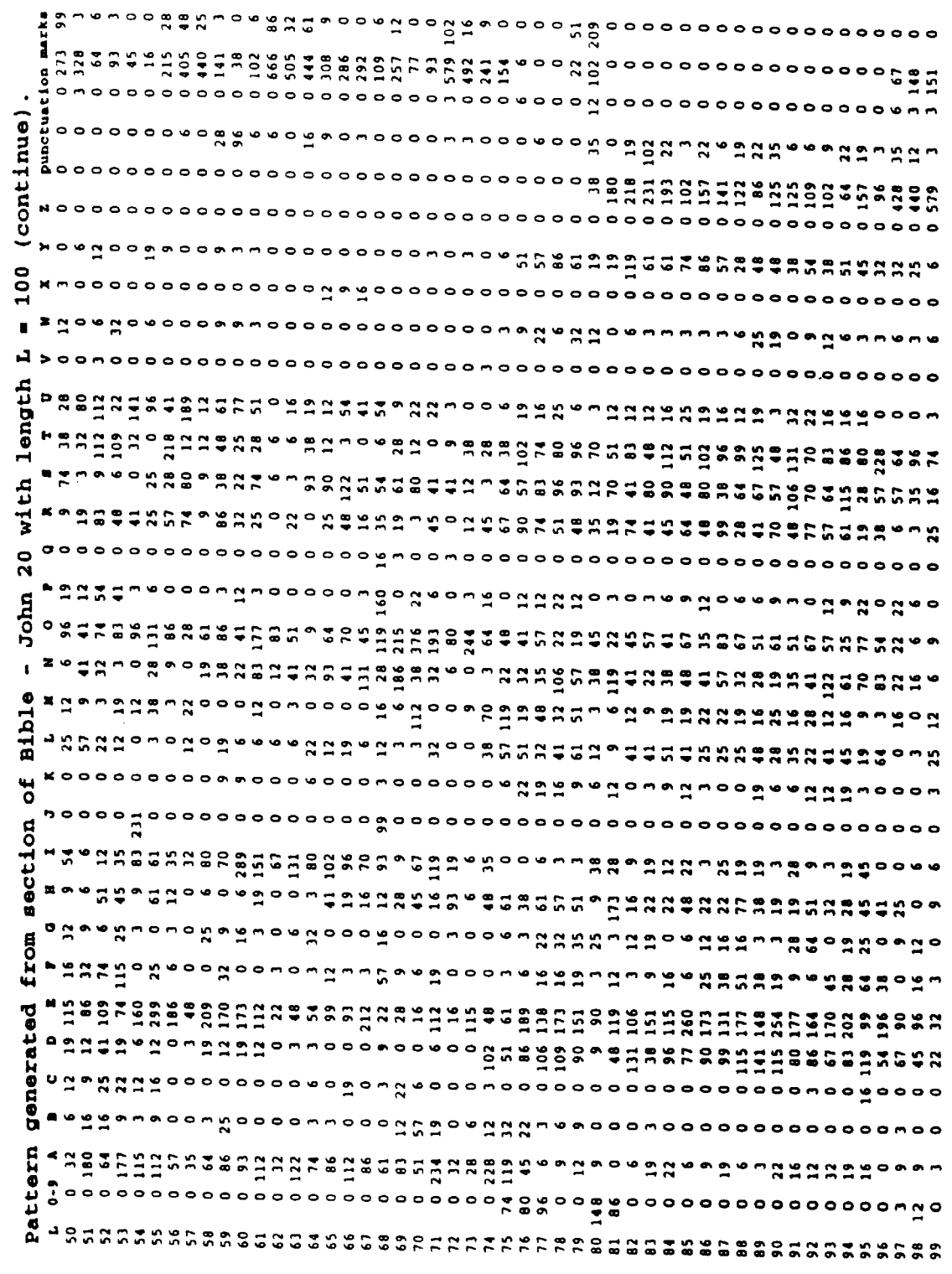

FIGS. 8C and 8D are the pattern sheet generated from the Book of John, Chapter 20 of the Bible. FIG. 8C is the portion of the pattern sheet for intervals 0 to 49. FIG. 8D is the portion of the pattern sheet for intervals 50 to 99.

Figure 8E:
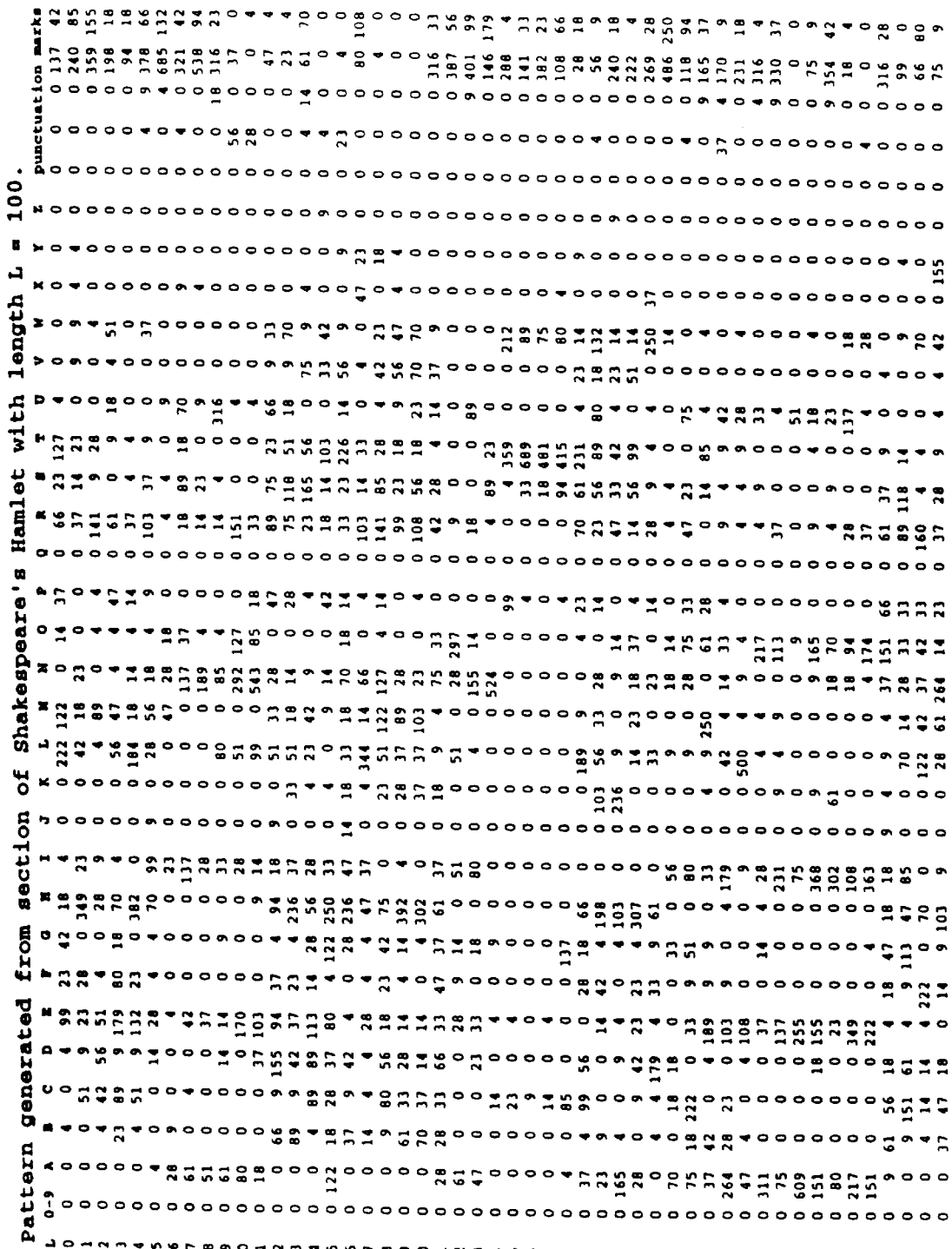
Figure 8F:
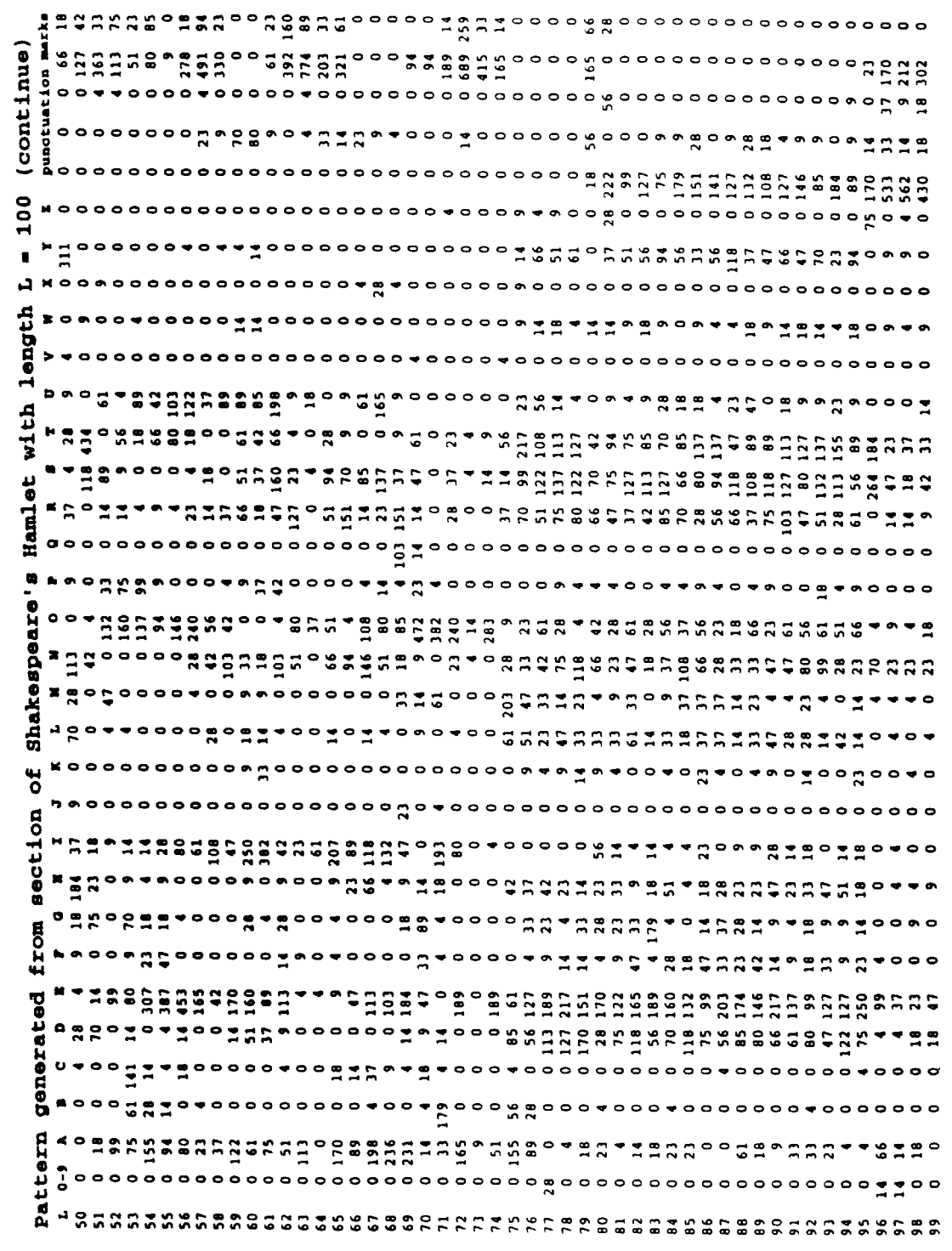

FIGS. 8E and 8F are the pattern sheet generated from Shakespeare's *Hamlet*. FIG. 8E is the portion of the pattern sheet for intervals 0 to 49. FIG. 8F is the portion of the pattern sheet for intervals 50 to 99.

Figure 8G:
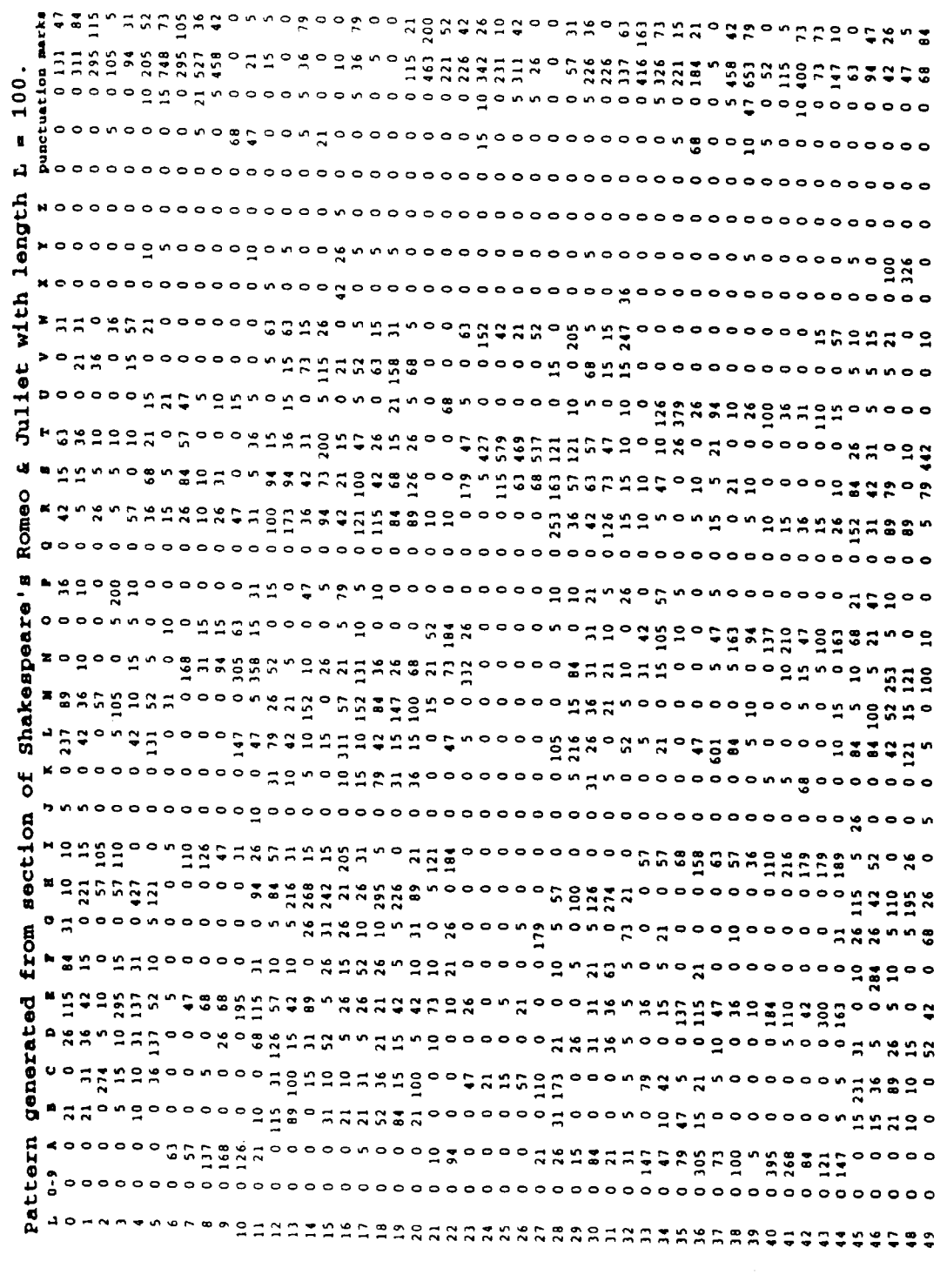
Figure 8H:
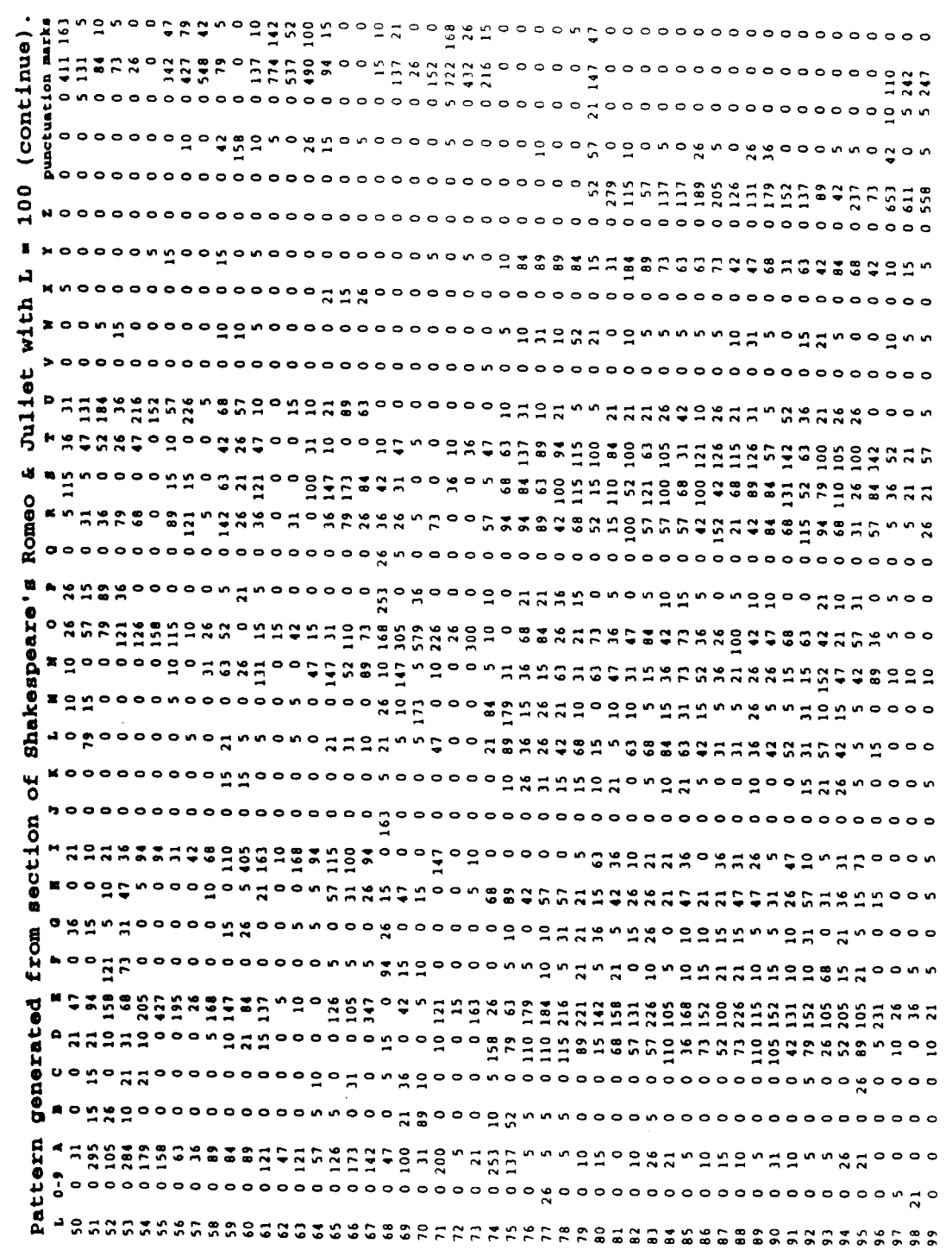

FIGS. 8G and 8H are the pattern sheet generated from Shakespeare's *Romeo and Juliet*. FIG. 8O is the portion of the pattern sheet for intervals 0 to 49. FIG. 8H is the portion of the pattern sheet for intervals 50 to 99.

Figure 9:
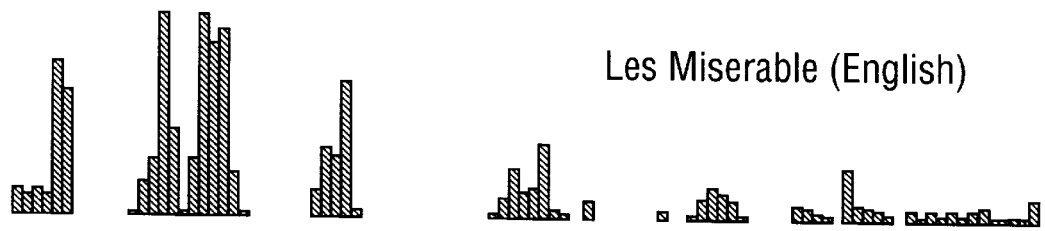
FIG. 9 is a plot of the occurrences of the letter H in four different languages of the same textual document.
Figure 9:
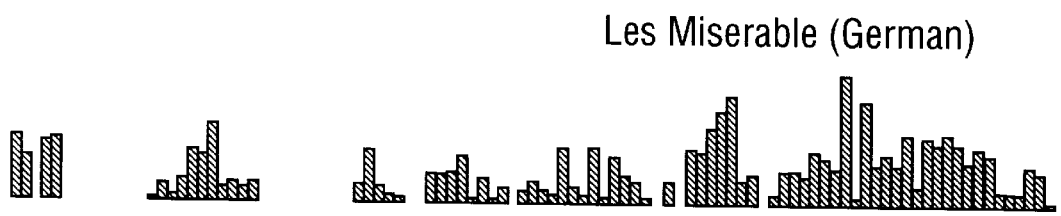
Figure 9:
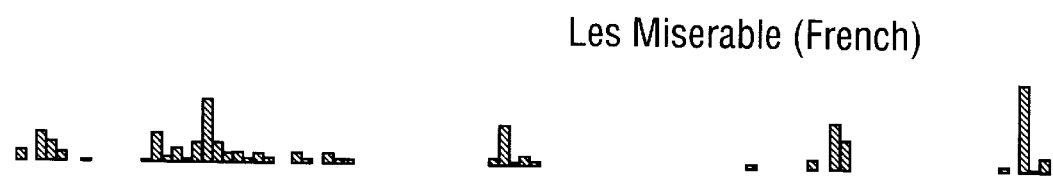
Figure 9:
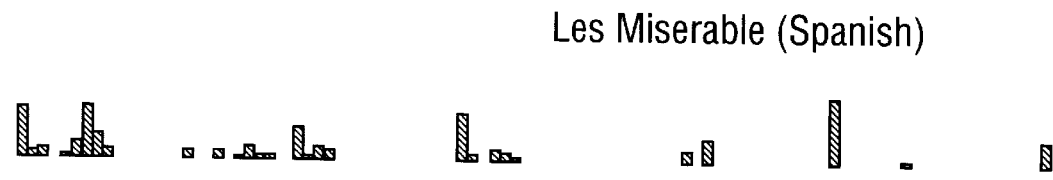

FIG. 9 is a plot of the column for the letter 'H' in Hugo's *Les Miserables* as translated into each of the four languages, English, French, German, and Spanish. It was derived from the pattern maps for the four different versions of *Les Miserables* in the same manner that the plot of FIG. 7 was derived from the corresponding documents.

Figure 10A:
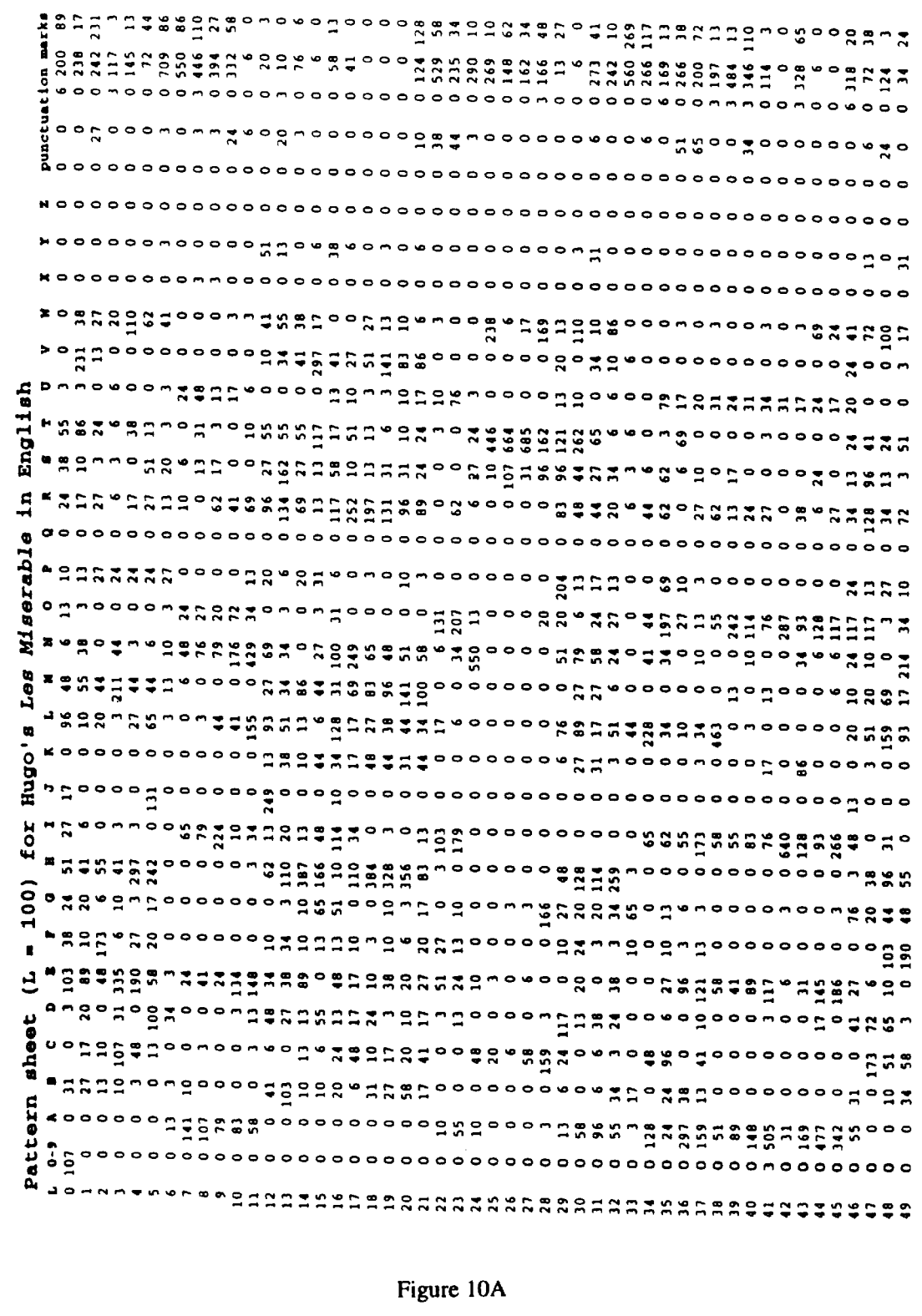
Figure 10B:
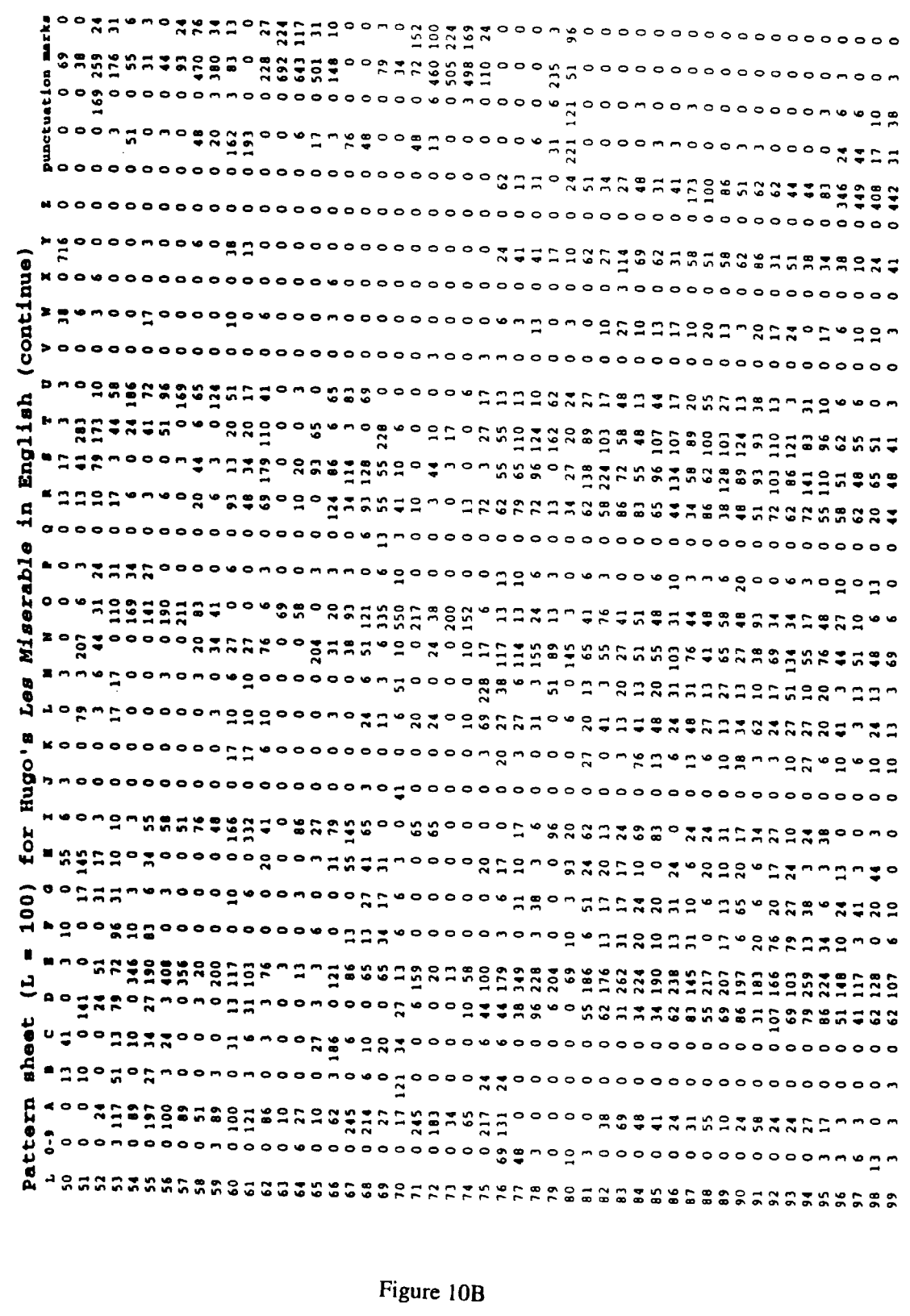

FIGS. 10A and 10B are the pattern sheet generated from the English language version of Hugo's *Les Miserables*. FIG. 10A is the portion of the pattern sheet for intervals 0 to 49. FIG. 10B is the portion of the pattern sheet for intervals 50 to 99.

Figure 10C:
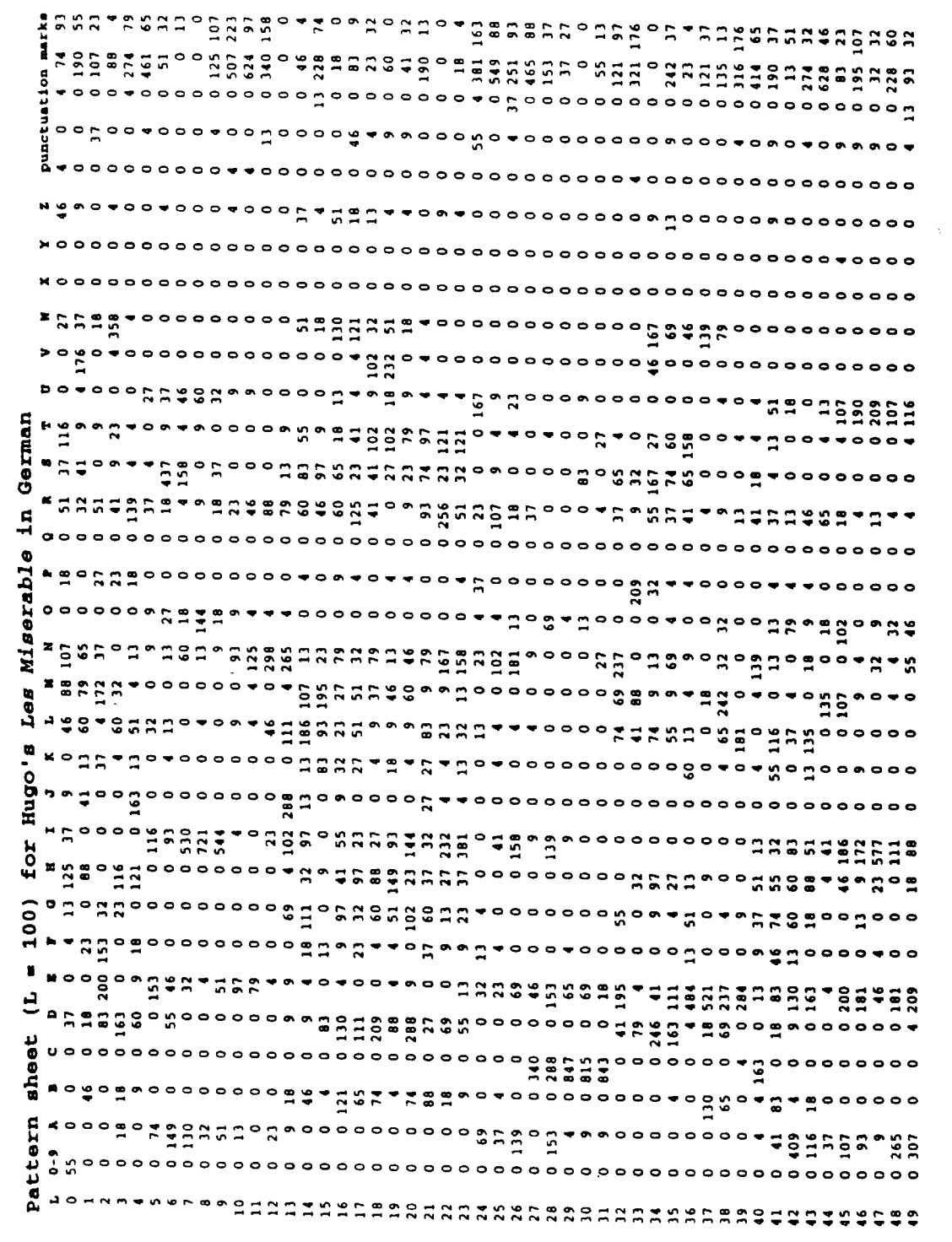
Figure 10D:
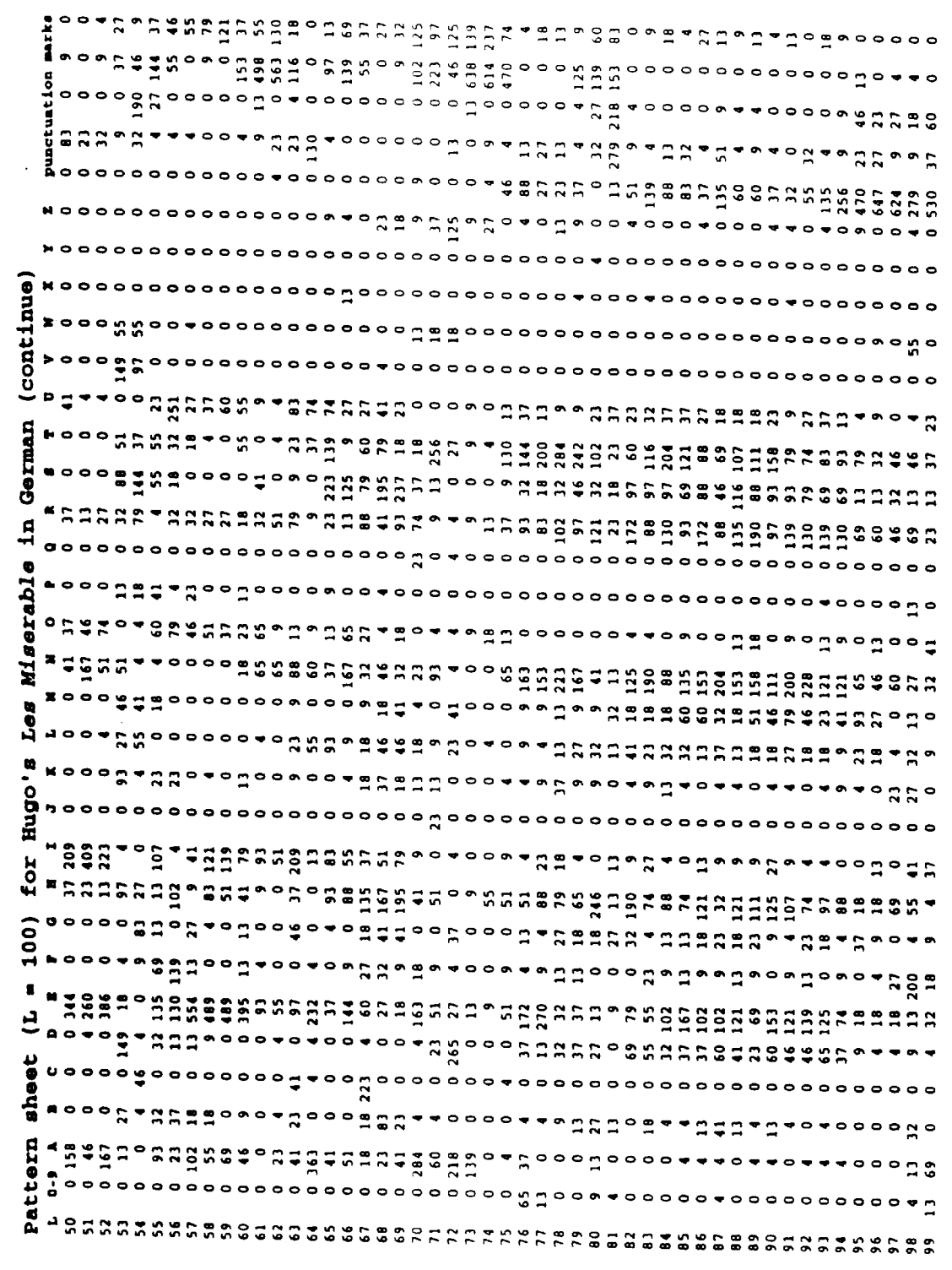

FIGS. 10C and 10D are the pattern sheet generated from the German language version of Hugo's *Les Miserables*. FIG. 10C is the portion of the pattern sheet for intervals 0 to 49. FIG. 10D is the portion of the pattern sheet for intervals 50 to 99.

Figure 10E:
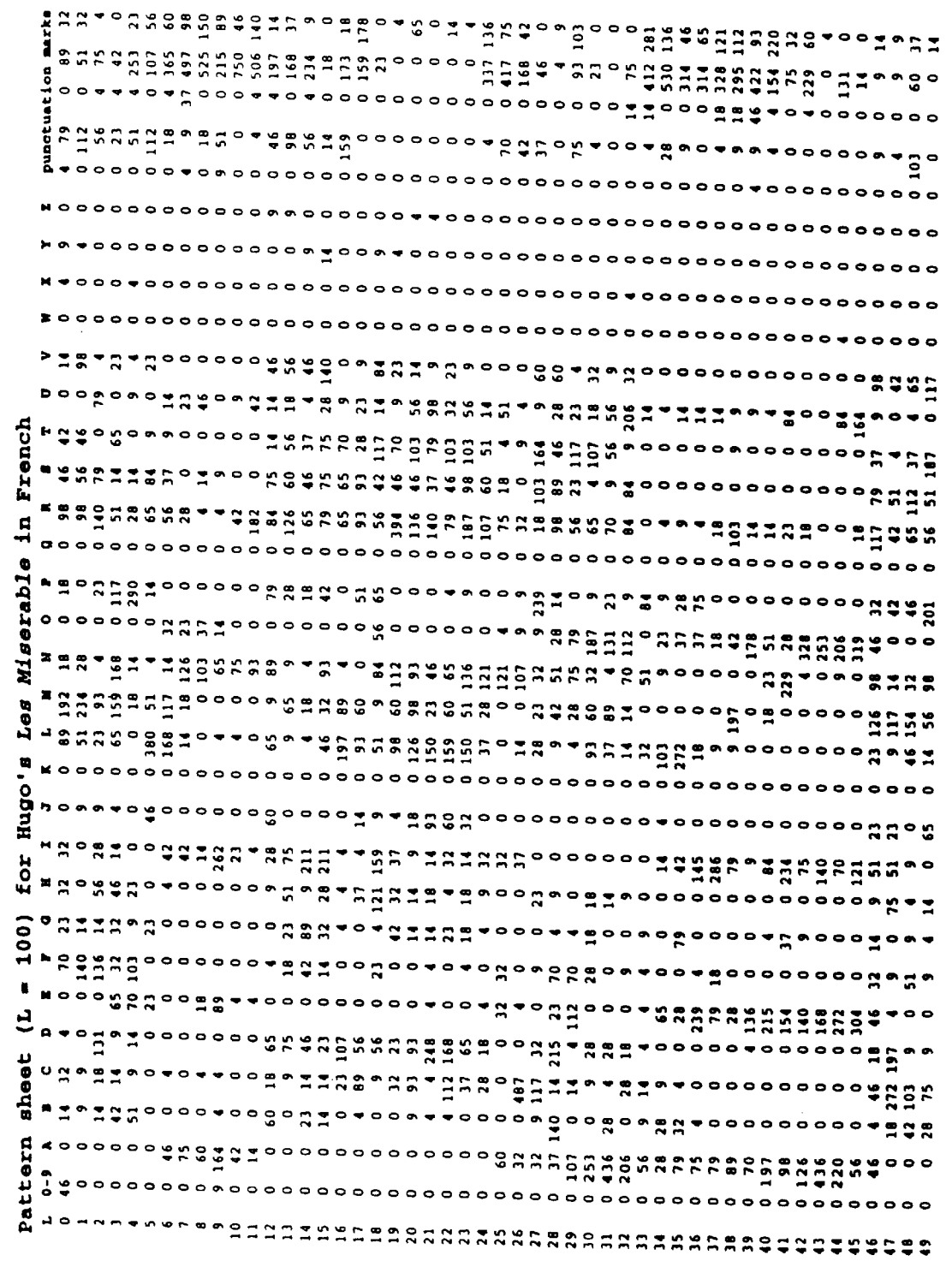
Figure 10F:
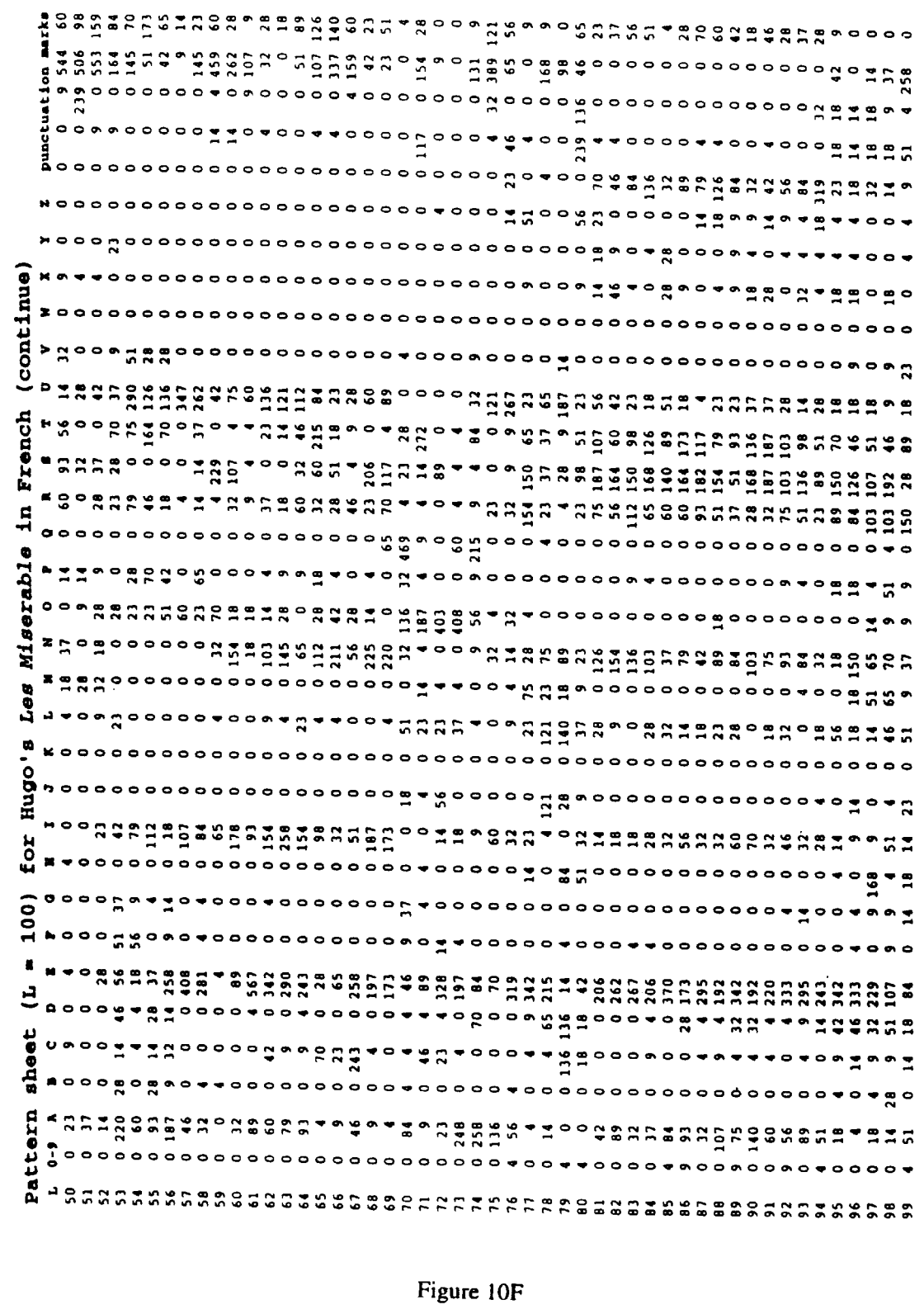

FIGS. 10E and 10F are the pattern sheet generated from the French language version of Hugo's *Les Miserables*. FIG. 10E is the portion of the pattern sheet for intervals 0 to 49. FIG. 10F is the portion of the pattern sheet for intervals 50 to 99.

Figure 10G:
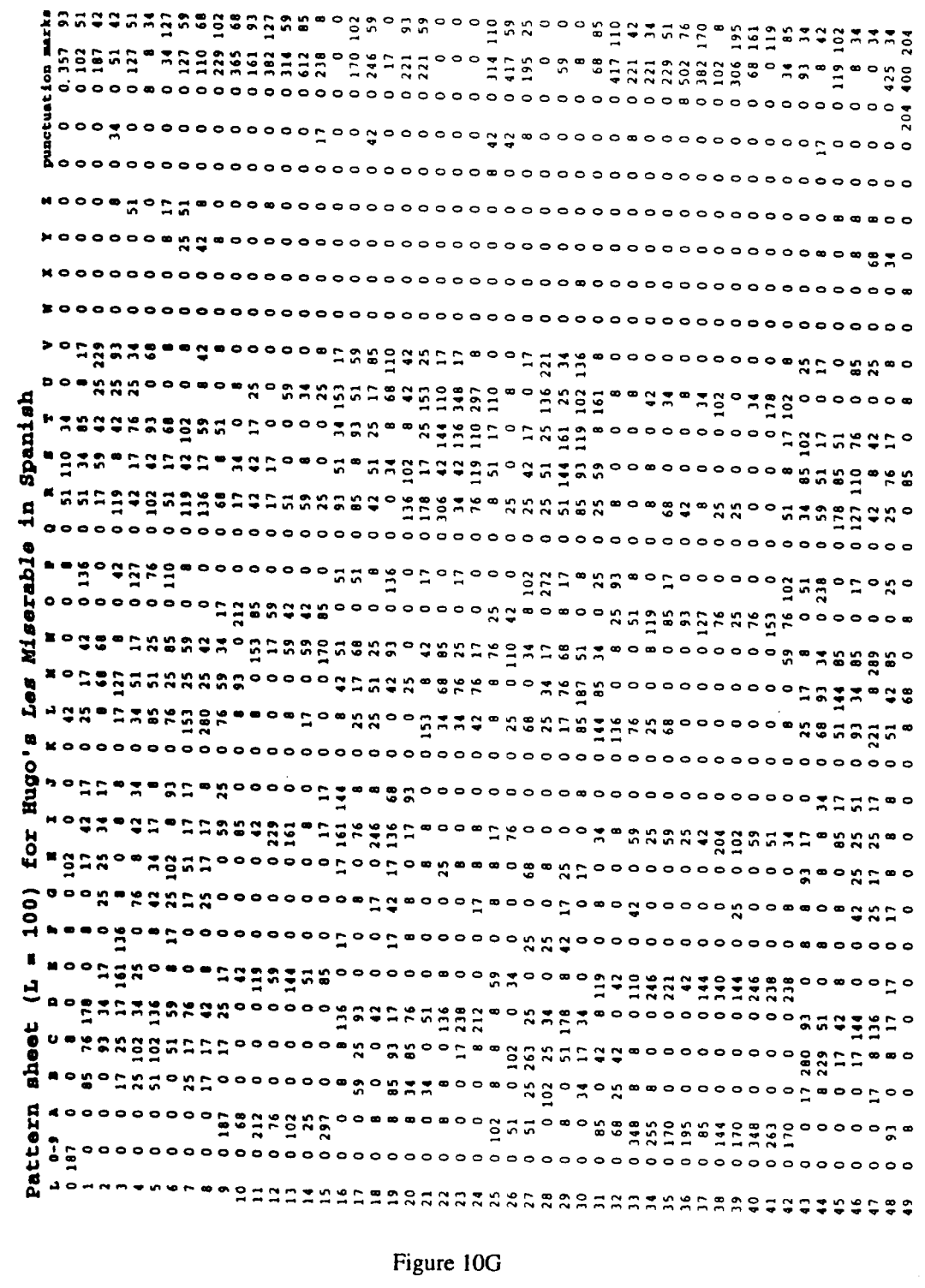
Figure 10H:
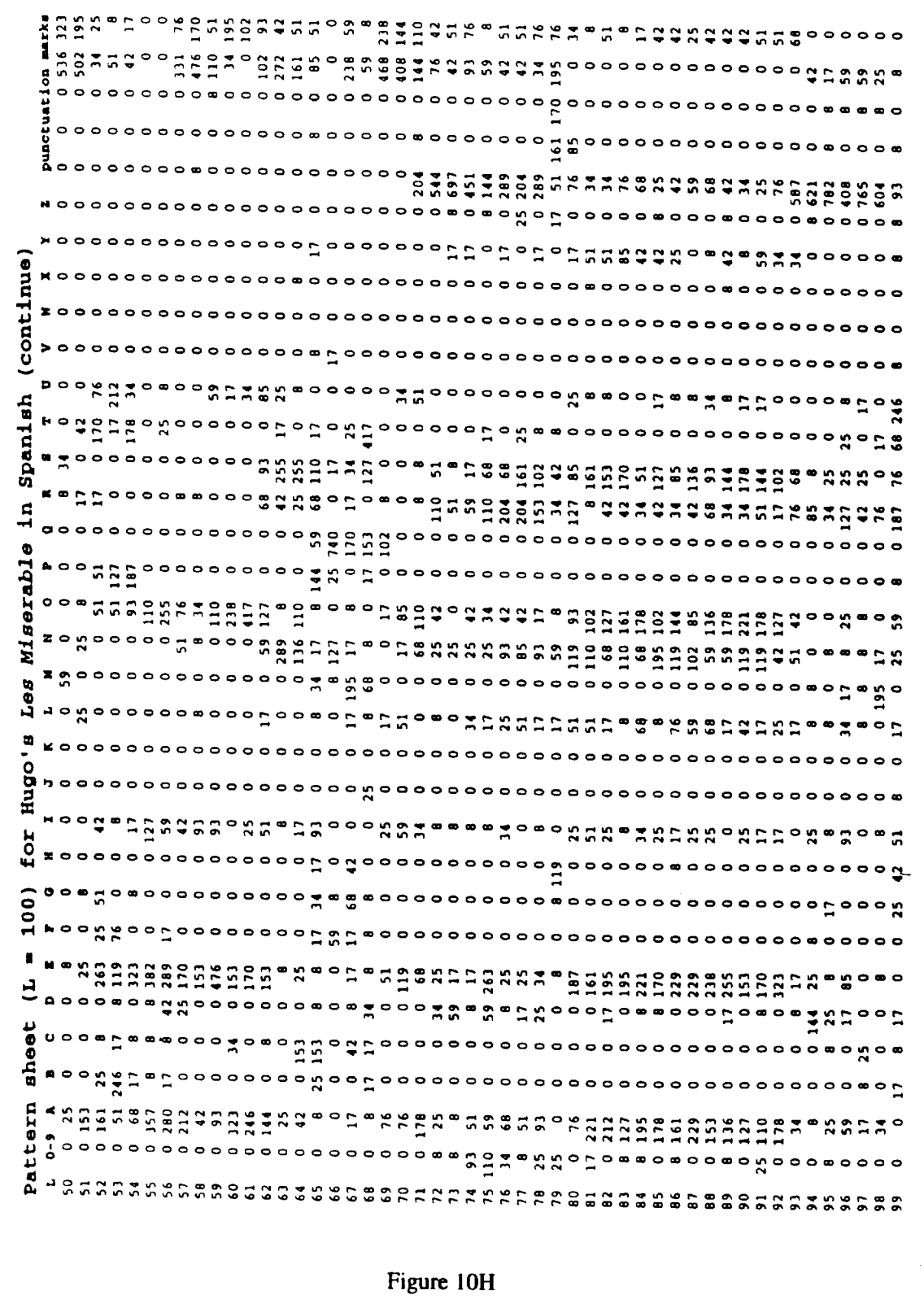

FIGS. 10G and 10H are the pattern sheet generated from the Spanish language version of Hugo's *Les Miserables*. FIG. 10G is the portion of the pattern sheet for intervals 0 to 49. FIG. 10H is the portion of the pattern sheet for intervals 50 to 99.

Note that other methods of displaying the pattern sheets and maps and relative pattern sheets and maps can be utilized. These include graphing as a curve the results of comparing a single column, graphing the pattern sheets or maps as two-dimensional color-coded or gray-scale plots, and graphing the pattern sheets or maps as three-dimensional representations.

FIG. 11 is the mapping table for the ASCII character set. This table is an array suitable for use in the C programming language. It allows a programmer to use a character as an index into the table yielding a number representing the corresponding column in a pattern sheet or map. It will be apparent to one skilled in the art that modifications of this mapping table could be used to map groups of characters to a single column of a pattern map or sheet. For instance, the five vowels ('a','e','i','o','u') could be mapped to a single column. Likewise, characters close to each other in the alphabet, (such as the sequence 'a','b','c','d'), could be mapped to a single column.

Figure 12:
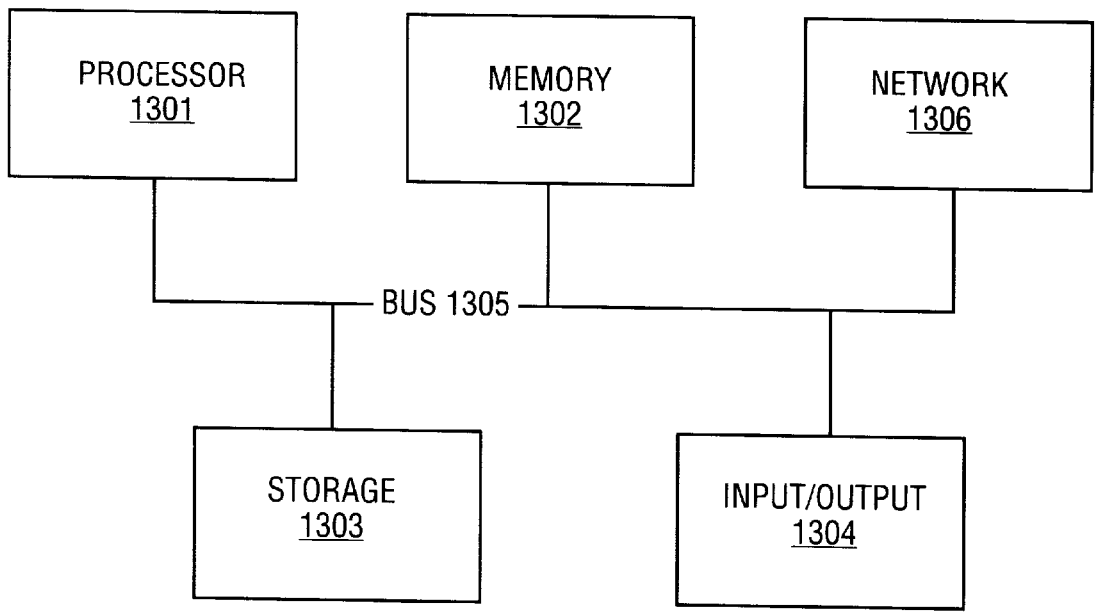
FIG. 12 illustrates a computer system that may be used in one embodiment of the present invention.

FIG. 12 shows a system useful in performing the transformation, mapping, and comparing involved in applicant's invention. The system includes processor 1301, Memory 1302, Storage Device 1303, Input/Output Device 1304, Bus 1305, and Network 1306. Note that the system need not have all of these components to function. In particular, it need not have storage device 1303 nor network 1306. Additionally, Input/Output Device 1304 can be split into an input device and an output device. Typically, the input device will be capable of reading machine readable media such as: magnetic disks, optical disks, carrier waves, magnetic tape, or documents (read optically).

As will be apparent to one skilled in the art, applicant's invention can be implemented as instructions on machine readable media, such as instructions in memory such as memory 1302 or other media such as transmission media, or as the logic of an application specific integrated circuit or programmable logic. In each of these cases, the implementation causes a machine, typically some form of processor, to execute the processes necessary to implement applicant's invention.

It will be apparent to one skilled in the art that applicant's invention can be utilized to automate cataloging and searching of databases. Text documents entered into a database can be transformed and mapped, thus producing individual maps for each document. Those documents can then be compared against other documents for classification according to author, type of document, language, and other forms of classification. Furthermore, a pattern map can be developed as a template, possibly derived from other documents or developed to correspond to the type of document sought. Such a pattern map could be compared to pattern maps of documents in a database with the results reported to someone searching for such a document.

In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A method of processing textual data comprising:

performing a Burrows-Wheeler transform on the textual data to produce transformed textual data;

dividing the transformed textual data into a set of one or more intervals;

mapping the transformed textual data of the set of intervals of transformed textual data thereby producing a first pattern sheet, the first pattern sheet composed of a set of at least one entries; and comparing the first pattern sheet to a second pattern sheet.

2. The method of claim 1 wherein:

the method further comprises normalizing the first pattern sheet for purposes of comparison to the second pattern sheet, thereby producing a first pattern map; and the step of comparing the first pattern sheet to a second pattern sheet comprises comparing the first pattern map to a second pattern map, the second pattern map derived from the second pattern sheet.

3. The method of claim 2 wherein normalizing the first pattern sheet comprises multiplying each entry of the first pattern sheet by a scale factor.

4. The method of claim 2 further comprising:

plotting a result of comparing the first pattern sheet to a second pattern sheet as a three dimensional graph.

5. The method of claim 2 further comprising:

summing the entries of a third pattern map to produce a number, the third pattern map derived from comparing the first pattern sheet to a second pattern sheet.

6. The method of claim 1 wherein the second pattern sheet is derived from documents selected from the group consisting of documents believed to have been written by a single individual, documents representative of a specific language, documents representative of a specific type of document, and documents written at a specific time.

7. The method of claim 1 wherein the intervals of the set of one or more intervals overlap.

8. The method of claim 1 further comprising:

normalizing the first pattern sheet to produce a first pattern map; and updating a class map by combining the contents of the first pattern map with the contents of the class map.

9. The method of claim 8 wherein normalizing the first pattern sheet to produce a first pattern map comprises multiplying each entry in the first pattern sheet by a scale factor, the scale factor derived from the first pattern sheet and the class map.

10. The method of claim 8 wherein normalizing the first pattern sheet to produce a first pattern map comprises multiplying selected entries in the first pattern sheet by a first scale factor, the first scale factor derived from the first pattern sheet and the class map, and multiplying unselected entries by a second scale factor, the second scale factor also derived from the first pattern sheet and the class map.

11. The method of claim 1 wherein comparing the first pattern sheet to a second pattern sheet comprises comparing the magnitude of each entry in the first pattern sheet relative to the total of all entries in the first pattern sheet to the magnitude of a corresponding entry in the second pattern sheet relative to the total of all entries in the second pattern sheet.

12. A method of processing textual data comprising:

transforming the textual data;

mapping the textual data to produce a first pattern sheet; and generating a result, the result reflecting a comparison of the first pattern sheet and a second pattern sheet.

13. The method of claim 12 wherein the second pattern sheet is derived from a set of documents.

14. The method of claim 13 wherein the set of documents have a common characteristic.

15. The method of claim 12 further comprising dividing the textual data into a set of one or more intervals.

16. The method of claim 12 wherein transforming the textual data comprises using the Burrows-Wheeler transform.

17. A machine readable medium embodying instructions, the instructions when executed by a machine causing the machine to perform the method comprising:

performing a Burrows-Wheeler transform on the textual data to produce transformed textual data;

dividing the transformed textual data into a set of one or more intervals;

mapping the transformed textual data of the set of intervals of transformed textual data thereby producing a first pattern sheet, the first pattern sheet composed of a set of at least one entries; and comparing the first pattern sheet to a second pattern sheet.

18. The machine readable medium of claim 17 wherein:

the method further comprises normalizing the first pattern sheet for purposes of comparison to the second pattern sheet, thereby producing a first pattern map; and the step of comparing the first pattern sheet to a second pattern sheet comprises comparing the first pattern map to a second pattern map, the second pattern map derived from the second pattern sheet.

19. The machine readable medium of claim 17 wherein the second pattern sheet is derived from documents selected from the group consisting of documents believed to have been written by a single individual, documents representative of a specific language, documents representative of a specific type of document, and documents written at a specific time.

20. The machine readable medium of claim 17 wherein the intervals of the set of one or more intervals overlap.

21. The machine readable medium of claim 17 wherein the method further comprises:

normalizing the first pattern sheet to produce a first pattern map; and updating a class map by combining the contents of the first pattern map with the contents of the class map.

22. A system comprising a processor and memory, said processor configured to perform a Burrows-Wheeler transform on the textual data to produce transformed textual data, divide the transformed textual data into a set of one or more intervals,map the transformed textual data of the set of intervals of transformed textual data thereby producing a first pattern sheet, the first pattern sheet composed of a set of at least one entries, and compare the first pattern sheet to a second pattern sheet.

23. The system of claim 22 wherein the processor is further configured tonormalize the first pattern sheet for purposes of comparison to the second pattern sheet, thereby producing a first pattern map, and the comparison of the first pattern sheet to a second pattern sheet comprises comparing the first pattern map to a second pattern map, the second pattern map derived from the second pattern sheet.

24. The system of claim 22 wherein said processor is further configured to normalize the first pattern sheet to produce a first pattern map, and update a class map by combining the contents of the first pattern map with the contents of the class map.

\* \* \* \* \*